United States Patent
Imoto et al.

(10) Patent No.: US 8,933,886 B2
(45) Date of Patent: Jan. 13, 2015

(54) INSTRUCTION INPUT DEVICE, INSTRUCTION INPUT METHOD, PROGRAM, RECORDING MEDIUM, AND INTEGRATED CIRCUIT

(75) Inventors: Hiroyasu Imoto, Hyogo (JP); Shigenori Maeda, Kyoto (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 129 days.

(21) Appl. No.: 13/634,183

(22) PCT Filed: Jun. 16, 2011

(86) PCT No.: PCT/JP2011/003455
§ 371 (c)(1),
(2), (4) Date: Sep. 11, 2012

(87) PCT Pub. No.: WO2011/158511
PCT Pub. Date: Dec. 22, 2011

(65) Prior Publication Data
US 2013/0002551 A1    Jan. 3, 2013

(30) Foreign Application Priority Data
Jun. 17, 2010  (JP) ................. 2010-138783

(51) Int. Cl.
*G06F 3/033* (2013.01)
*G06F 3/01* (2006.01)
*G06F 3/0346* (2013.01)

(52) U.S. Cl.
CPC ............ *G06F 3/013* (2013.01); *G06F 3/017* (2013.01); *G06F 3/0346* (2013.01); *G06F 3/011* (2013.01)
USPC ..................................................... 345/158

(58) Field of Classification Search
CPC ......... G06F 3/012; G06F 3/013; G06F 3/017; G06F 3/0346
See application file for complete search history.

(56) References Cited

U.S. PATENT DOCUMENTS

| 7,075,524 B2 | 7/2006 | Kobayashi et al. |
| 7,123,214 B2 * | 10/2006 | Kuroki et al. ............ 345/8 |

(Continued)

FOREIGN PATENT DOCUMENTS

| JP | 9-128138 | 5/1997 |
| JP | 10-20998 | 1/1998 |

(Continued)

OTHER PUBLICATIONS

International Search Report issued Sep. 20, 2011 in International (PCT) Application No. PCT/JP2011/003455.

*Primary Examiner* — Amr Awad
*Assistant Examiner* — Randal Willis
(74) *Attorney, Agent, or Firm* — Wenderoth, Lind & Ponack, L.L.P.

(57) ABSTRACT

An instruction input device includes: a first direction detection unit detecting the first direction in which the user is looking; a second direction detection unit detecting a second direction in which the user is performing a pointing operation; a gaze position calculation unit calculating a gaze position of the user on the screen; a reference coordinate group calculation unit calculating a reference line in space corresponding to the gaze position and connecting the user and the screen; an offset amount calculation unit calculating a distance of the second direction between the reference line and the input coordinate indicating the user's hand as an offset amount with respect to the gaze position; and a pointer display position calculation unit calculating a position in which a distance of the first screen predetermined direction between the position and the gaze position is the offset amount on the screen.

19 Claims, 19 Drawing Sheets

(56) References Cited

U.S. PATENT DOCUMENTS

| | | |
|---|---|---|
| 7,486,281 B2 | 2/2009 | Kobayashi et al. |
| 8,175,374 B2 | 5/2012 | Pinault et al. |
| 2004/0021645 A1* | 2/2004 | Kobayashi et al. ........... 345/173 |
| 2006/0202973 A1 | 9/2006 | Kobayashi et al. |
| 2009/0128489 A1* | 5/2009 | Liberty et al. ................ 345/158 |
| 2009/0315827 A1* | 12/2009 | Elvesjo et al. ................ 345/157 |
| 2010/0208035 A1 | 8/2010 | Pinault et al. |
| 2011/0102570 A1* | 5/2011 | Wilf et al. ...................... 348/77 |

FOREIGN PATENT DOCUMENTS

| | | |
|---|---|---|
| JP | 2003-76488 | 3/2003 |
| JP | 2004-62658 | 2/2004 |
| JP | 3952896 | 8/2007 |
| JP | 2008-171337 | 7/2008 |
| WO | 2008/128568 | 10/2008 |

* cited by examiner (b-1) Flow of offset amount calculation (b-2) Setting three axes

INSTRUCTION INPUT DEVICE, INSTRUCTION INPUT METHOD, PROGRAM, RECORDING MEDIUM, AND INTEGRATED CIRCUIT

TECHNICAL FIELD

The present invention relates to instruction input devices and instruction input methods for calculating a display position of a pointer to be displayed on the screen based on a pointing operation of movement of a user's hand.

BACKGROUND ART

Along with an increase in display size and screen size, there is a growing possibility that the displays are used not only for program viewing and information browsing but also for new usages such as simultaneous use of a plurality of pieces of information, browsing of a massive amount of information, and an electronic advertising system which displays advertisement on a display.

Moreover, an instruction input device is known for allowing a user to input information, with respect to a large screen display, from a location away from a display screen with the use of a coordinate input device held by the user or a pointing action.

In this kind of device, it is not easy for the user to move the coordinate input device held by the user or hands dexterously in order to point any position on the display screen. In the case where several people are using the devices at the same time, a shift to any position is often restricted by another user. Especially, it is significantly difficult for the user to perform an instruction input on a separated place on the screen. Therefore, it is desirable that an operation method is adopted for pointing any location on the display without moving in front of the display screen and with an easy operation.

In such a situation, with respect to the above described problem, an operation method for enabling an instruction input on any position with ease even from a separated place is proposed. A method is known for moving a pointer to a gaze point on the screen when gazing at the screen for a predetermined time or longer and for relatively moving the pointer from the position with an input device (refer to Patent Literature 1). Moreover, there is a technique for allowing for operating the whole screen with the use of a coordinate input device which can switch between an absolute input and a relative input and enhancing operability by estimating an operation plane in which the user is moving the coordinate input device in the space (refer to Patent Literature 2). Furthermore, it is known that there is a device which holds a means for switching to a mode of reducing an amount of movement of a pointer with respect to the movement of the coordinate input device, based on the moving state of the pointer on the display screen (refer to Patent Literature 3).

CITATION LIST

Patent Literature

[PTL 1]
 Japanese Unexamined Patent Application Publication No, 9-128138
[PTL 2]
 Japanese Patent No. 3952896
[PTL 3]
 Japanese Unexamined Patent Application. Publication No. 2008-171337

SUMMARY OF INVENTION

Technical Problem

However, the above described techniques do not ensure that a positional relationship between a hand that the user is extending in the same direction as the direction in which the user is looking and a pointer on the screen corresponding to the hand is not changed. In other words, in the conventional techniques, there is a case where a pointer is displayed on a different position when the user moves a hand to a different position on a line in a state where there is a user's hand on the line along a direction (gaze direction) in which the user is looking For example, after moving from a first position on the line to a second position deviating from the line, the user moves the hand to a third position on the line. In this case, if the first position and the third position are mutually different on the line although the direction in which the user is looking when the hand is in the first position and the direction in which the user is looking when the hand is in the third position are the same, the display positions of the pointer are different. For example, if the distance from the first position to the second position is different from the distance from the second position to the third position, the display positions of the pointer are different. The user assumes that the pointer will be displayed at the same position on the screen, even if there is a hand in a mutually different position on the line when there is a hand on the line along a gaze direction, Therefore, the above described techniques have a problem that a pointer is displayed on a position different from the user's supposition and it is difficult for the user to manipulate the position of the pointer according to the wishes of the user.

Furthermore, since the user performs a pointing operation by inclining the body or the face with respect to the screen in the case where the user operates in a position away from the screen, there are gaps among a body orientation, a gaze orientation, and a screen orientation. Since the above described conventional techniques do not pay attention to the orientation gaps, there is a wide gap between an amount of movement of a hand by the user and an amount of movement of the pointer on the screen, and the user does not know how much movement is necessary for moving the pointer to a target position. Therefore, it is difficult to manipulate the pointer according to the wishes.

The present invention has an object to solve the above described problems and to provide an instruction input device, an instruction input method, and the like which are easy for a user to understand and operate intuitively by calculating the position of the pointer such that there is no change in a positional relationship between a hand that a user has extended in a direction in which the user is looking and the pointer on the screen corresponding to the hand and such that there is no change in a correspondence relationship between an amount of movement of a hand by the user and an amount of movement of the pointer on the screen.

Solution to Problem

In order to attain the above mentioned object, an instruction input device according to an aspect of the present invention is An instruction input device which calculates a display position of a pointer to be displayed on a screen, based on a pointing operation of movement of a hand of a user, the instruction input device comprising: a user position detection unit configured to detect a position of the user; an input coordinate detection unit configured to detect, as an input coordinate, a coordinate indicating a position of the hand of the user; a first direction detection unit configured to detect, based on a body posture of the user, a first direction which is a direction in which the user is looking; a second direction detection unit configured to detect, based on the body posture of the user, a second direction which is a direction in which the user is performing the pointing operation; a gaze position calculation unit configured to calculate a gaze position of the user on the screen, based on the position of the user and the first direction; a reference line calculation unit configured to calculate a reference line in space between the user and the screen, based on the position of the user and the first direction, the reference line being a line corresponding to the gaze position; an offset amount calculation unit configured to calculate a distance in the second direction between the reference line and the input coordinate as an offset amount with respect to the gaze position in a first screen predetermined direction along the screen; and a pointer display position calculation unit configured to calculate, as the display position of the pointer to be displayed on the screen, a position in which a distance of the first screen predetermined direction between the position and the gaze position is the offset amount on the screen.

With this configuration, the display position of the pointer can be calculated based on the direction in which the user is looking and the direction in which the user is performing a pointing operation. In other words, a distance of the second direction between the reference line (reference coordinate group) and input coordinate is calculated as an offset amount with respect to the gaze position, and on the screen, a position in which a distance of the first screen predetermined direction between the gaze position becomes the offset amount is calculated as the display position of the pointer. Therefore, it is possible to ensure that there is no change in a positional relationship between the hand extended in a direction in which the user is looking and the pointer on the screen corresponding to the hand. Furthermore, it is possible to calculate the display position of the pointer such that there is no change in correspondence relationship between the amount of movement of the user's hand and the amount of movement of the pointer on the screen. As a result, it is possible to implement an instruction input device which is easy for a user to understand and operate intuitively.

Moreover, it is favorable that the position of the user is a face position or a head position of the user.

With this configuration, since the position of the user becomes the position of the face or the position of the head, it is possible to improve calculation accuracy of the gaze position of the user.

Moreover, it is favorable that the instruction input device further comprises a three-dimensional coordinate input device which outputs a self position when held by the user, wherein the input coordinate detection unit is configured to detect, as the input coordinate, a coordinate of the self position output by the three-dimensional coordinate input device.

With this configuration, it is possible to improve detection accuracy of the input coordinate which indicates the position of the user's hand.

Moreover, it is favorable that the instruction input device further comprises an imaging unit configured to capture an image of the user, wherein the input coordinate detection unit is configured to detect the input coordinate indicating the position of the hand of the user, based on an image captured by the imaging unit.

With this configuration, it is possible to improve the user convenience because it is possible to detect the input coordinate even in the case where the user does not hold a three-dimensional coordinate input device.

Moreover, it is favorable that the input coordinate detection unit is further configured to recognize right and left hands of the user based on an image captured by the imaging unit, and detect the input coordinate for each of the recognized right and left hands.

With this configuration, it is possible for the user to detect an input coordinate for each of the left and right hands and therefore to improve the user operability.

Moreover, it is favorable that the first direction detection unit is configured to detect the first direction based on the body posture of the user which includes at least one of a face orientation and a gaze.

With this configuration, it is possible to detect the first direction from at least one of the face orientation and the gaze.

Moreover, it is favorable that the second direction detection unit is configured to detect the second direction based on the body posture of the user which includes at least a body orientation.

With this configuration, it is possible to detect the second direction from an orientation of the user's body.

Moreover, it is favorable that the second direction detection unit is configured to detect the second direction based on the body posture of the user and a direction of the screen with respect to the position of the use.

With this configuration, it is possible to detect, as the second direction, a direction which is adapted to a positional relationship between the user's position and the position of the screen.

Moreover, it is favorable that the reference line calculation unit is configured to calculate the reference line based on the position of the user, the first direction, and the second direction, in the case where an angle between the first direction and the second direction is smaller than a predetermined angle.

With this configuration, in the case where the angle between the first direction and the second direction is smaller than the predetermined angle, it is difficult for the user to extend one of the hands onto a vector in a gaze direction which is determined with respect to the position of the head. In this case, it is possible to appropriately calculate the reference line with respect to one of the hands based on the second direction.

Moreover, it is favorable that the instruction input device further comprises a user information database which stores information indicating at least a correspondence relationship between a head position and a chest position of the user, wherein the reference line calculation unit is configured to calculate the reference line based on the position of the user, the first direction, and information indicating the correspondence relationship obtained from the user information database.

With this configuration, since it is possible to calculate the reference line with respect to the chest position of the user, it is possible to calculate the reference line according to a pointing operation by a natural posture of the user.

Moreover, it is favorable that the instruction input device further comprises a user information database which stores information indicating at least a chest position of each user; and a user recognition unit configured to recognize the user, wherein the reference line calculation unit is configured to calculate the reference line based on the position of the user, the first direction, and information which indicates at least the chest position of the user and is obtained from the user information database based on user recognition information indicating the user recognized by the user recognition unit.

With this configuration, it is possible to calculate the reference line which is adapted to the physical characteristics for each of the users.

Moreover, it is favorable that the reference line calculation unit is configured to calculate the reference line based on the position of the user, the first direction, information indicating the correspondence relationship obtained from the user information database, and the second direction, in the case where an angle between the first direction and the second direction is smaller than a predetermined angle.

With this configuration, in the case where the angle between the first direction and the second direction is smaller than the predetermined angle, it is difficult for the user to extend one of the hands onto a vector in a gaze direction with respect to the chest position. In this case, it is possible to appropriately calculate the reference line with respect to one of the hands based on the second direction.

Moreover, it is favorable that the instruction input device further comprises a user information database which stores information indicating at least a correspondence relationship between a head position and an arm length of the user, wherein the offset amount calculation unit is configured to calculate the offset amount based on the second direction and information indicating the correspondence relationship obtained from the user information database.

With this configuration, since it is possible to calculate the offset amount in consideration of the arm length of the user, it is possible to ensure that the amount of movement of the pointer on the screen with respect to the amount of movement of the user's hand is not changed according to a difference in the arm length of the user.

Moreover, it is favorable that the instruction input device further comprises a user information database which stores information indicating at least an arm length for each user; and a user recognition unit configured to recognize the user, wherein the offset amount calculation unit is configured to calculate the offset amount based on the second direction and information which indicates at least the arm length of the user, and the information is obtained from the user information database based on user recognition information indicating the user recognized by the user recognition unit.

With this configuration, it is possible to calculate the offset amount which is adapted to the physical characteristics for each of the users.

Moreover, it is favorable that the instruction input device further comprises a display unit configured to display the pointer on the display position calculated by the pointer display position calculation unit.

With this configuration, it is possible for the instruction input device to display the pointer.

Moreover, it is favorable that the offset amount calculation unit is configured to calculate a distance in a third direction between the reference line and the input coordinate as an other offset amount with respect to the gaze position in a second screen predetermined direction along the screen, the pointer display position calculation unit is configured to calculate, as a display position of the pointer displayed on the screen, a position in which a distance in the second screen predetermined direction between the position and the gaze position is the other offset amount on the screen, and the third direction is a direction different from the first direction and the second direction, and the second screen predetermined direction is a direction different from the first screen predetermined direction.

With this, the distance of the second direction and the distance of the third direction each between the reference line and the input coordinate are each calculated as an offset amount, and positions away by the offset amounts in the first screen predetermined direction and the second screen predetermined direction from the gaze position are calculated as the display positions of the pointers. Therefore, it is possible to implement an instruction input device which is easy for a user to understand and operate intuitively in a two dimension.

It should be noted that the present invention can be implemented not only as the instruction input device but also as an instruction input method which performs, as steps, operations of the constituent elements included in the instruction input device. Moreover, the present invention can be implemented as a program that causes a computer to execute the respective steps included in the instruction input method. Naturally, such a program can be distributed in a recording medium such as a Compact Disc Read Only Memory (CD-ROM), or a transmission medium such as the Internet.

Advantageous Effects of Invention

The present invention makes it possible to calculate the display position of the pointer based on the direction in which the user is looking and the direction in which the user is performing a pointing operation. Therefore, it is possible to ensure that there is no change in positional relationship between the hand extended in a direction in which the user is looking and the pointer on the screen corresponding to the hand. Furthermore, it is possible to calculate the display position of the pointer such that there is no change in correspondence relationship between the amount of movement of the user's hand and the amount of movement of the pointer on the screen. As a result, it is possible to implement an instruction input device which is easy for a user to understand and operate intuitively.

DESCRIPTION OF EMBODIMENTS

Hereafter, embodiments of the present invention will be described with reference to the drawings.

[Embodiment 1]

<Outline>

An instruction input device according to the present invention is suitable for a large screen display operated by one or more users, and controls pointer positions displayed on the screen according to a pointing operation by a user.

Here, the pointing operation is a gesture operation by the user's hand and an operation for moving a pointer. Moreover, the pointer is an image displayed on a position on the screen pointed by the user. It should be noted that a form of the pointer (shape, design, and color) does not have to be limited to a specific form, and any form is acceptable as long as the form can be recognized by the user, For example, the pointer is typically an image of a white or black arrow, <Configuration>

Figure 1:
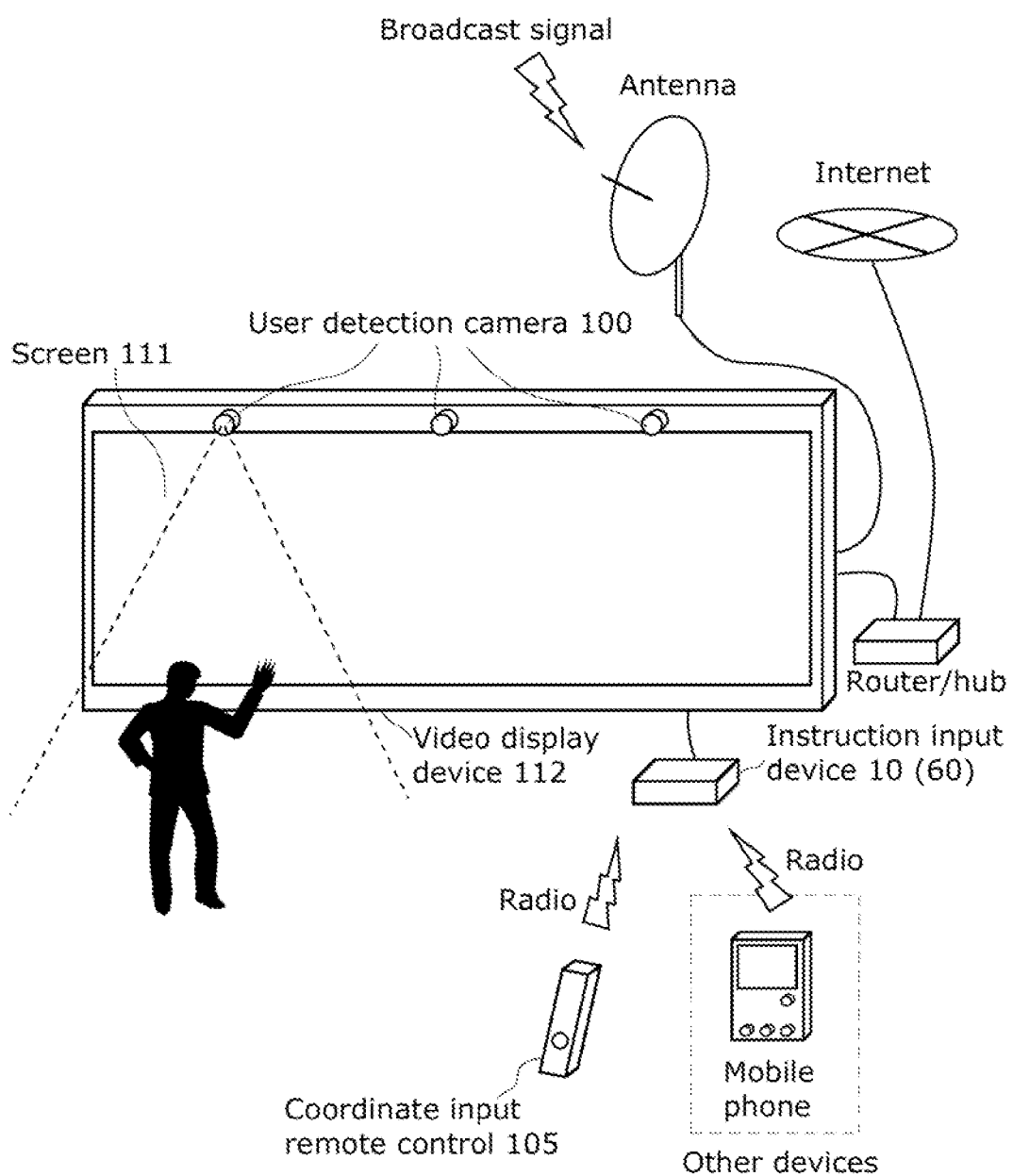
FIG. 1 is a diagram for explaining an outer appearance of an instruction input device according to Embodiment 1 or 2 of the present invention and an example of an interface with relevant devices.

FIG. 1 is a diagram for explaining an outer appearance of the instruction input device according to the present embodiment of the present invention and an example of an interface with relevant devices.

A video display device 112 displays an image or video on a screen 111 based on broadcast signal received by an antenna for receiving a broadcast program or the like.

A user detection camera 100 is installed in the vicinity of the screen 111 included in the video display device 112, and captures an image of the user located in front of the screen.

An instruction input device 10 controls the video display device 112 based on the position and movement of the user, or body posture of the user that are detected by an analysis of image information captured by the user detection camera 100.

It should be noted that the instruction input device 10 may control the video display device 112 based on a position and a movement of a hand of the user who is holding a coordinate input remote control 105 and a user's operation of the remote control such as pushing down of a button disposed on the remote control.

Moreover, the instruction input device 10 may control the video display device 112 based on, for example, a position and a movement of a hand of the user who is holding another device such as a mobile phone and a user's operation of the remote control such as pushing down of buttons disposed on the mobile phone.

Moreover, the video display device 112 is connected to the Internet via a router/hub or the like, and can display digital information obtained from the Internet.

Moreover, although not illustrated in FIG. 1, a plurality of speakers held by the video display device 112 may be separately disposed at the top and the bottom of the video display device 112 or at the right end and the left end of the video display device 112.

Figure 2:
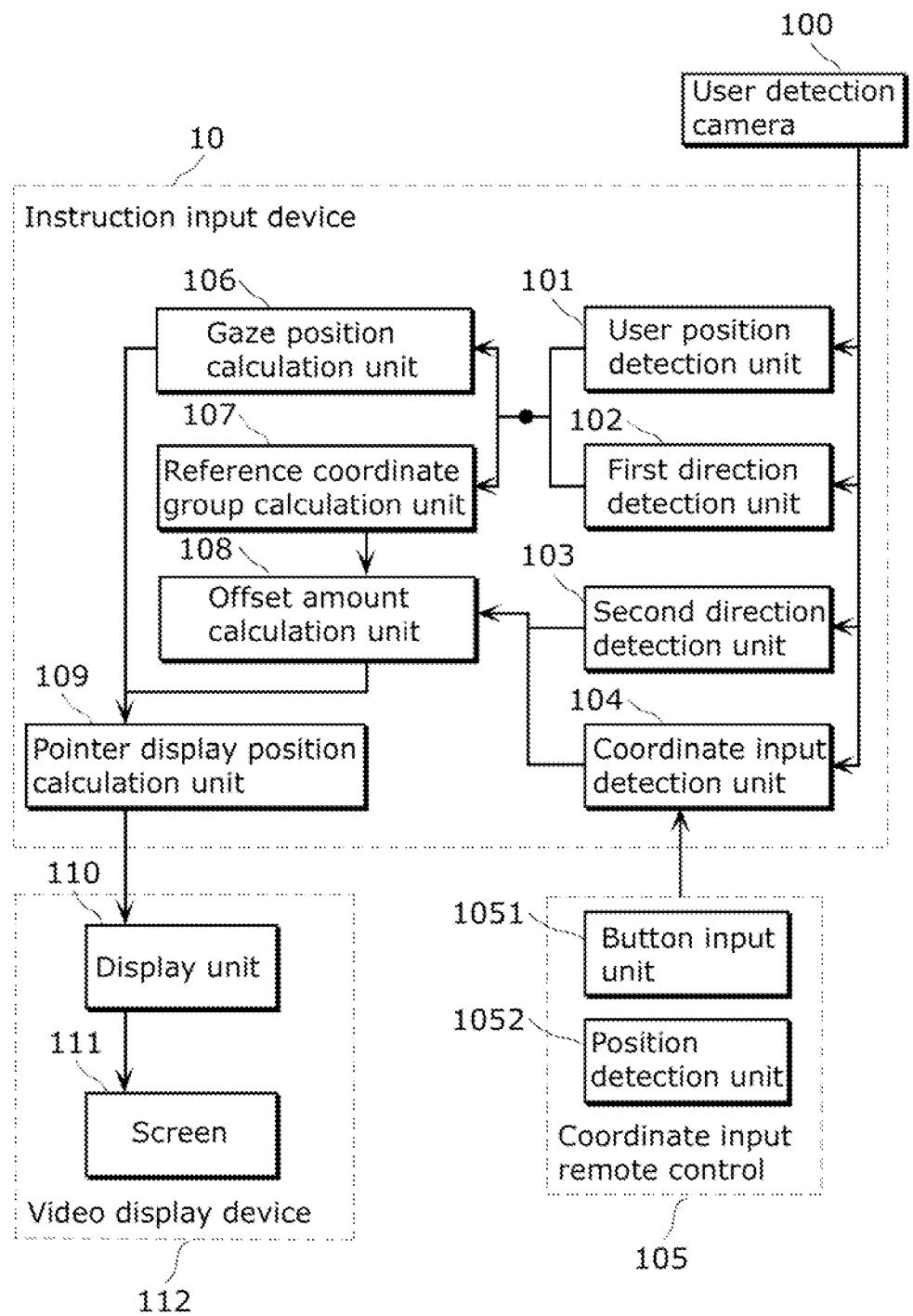
FIG. 2 is a main functional block diagram of the instruction input device according to Embodiment 1 of the present invention.

FIG. 2 is a diagram showing a configuration example of the instruction input device according to Embodiment 1 of the present invention.

The user detection camera 100 captures an image of the user in front of the screen 111 and transmits the image obtained by the image capture to the instruction input device 10.

The instruction input device 10 calculates a display position of a pointer displayed on the screen based on a pointing operation by the user. The instruction input device 10 includes a user position detection unit 101, a first direction detection unit 102, a second direction detection unit 103, and a coordinate input detection unit 104. Furthermore, the instruction input device 10 includes a gaze position calculation unit 106, a reference coordinate group calculation unit 107, an offset amount calculation unit 108, and a pointer display position calculation unit 109.

The coordinate input remote control 105 is an example of a three-dimensional coordinate input device. The coordinate input remote control 105 outputs a position of the coordinate input remote control 105 in a state of being held by the user. The coordinate input remote control 105 includes a button input unit 1051 and a position detection unit 1052.

The video display device 112 includes a display unit 110 and the screen 111. The display unit 110 displays a pointer on a display position on the screen 111 which is calculated by the pointer display position calculation unit 109.

<Motion>

The following will describe the function for each of the blocks in FIG. 2.

<User Detection Camera>

The user detection camera 100 is installed on the video display device 112 and includes an image sensor such as Charge Coupled Device (CCD). The user detection camera 100 captures an image of the user in front of the screen 111.

<User Position Detection Unit>

After extracting a user region from a plurality of images captured by the user detection camera 100, the user position detection unit 101 calculates a relative position of the user's face or head with respect to the screen 111 from a correspondence relationship of the user region in the plurality of images based on the principle of stereoscopy.

Figure 3A:
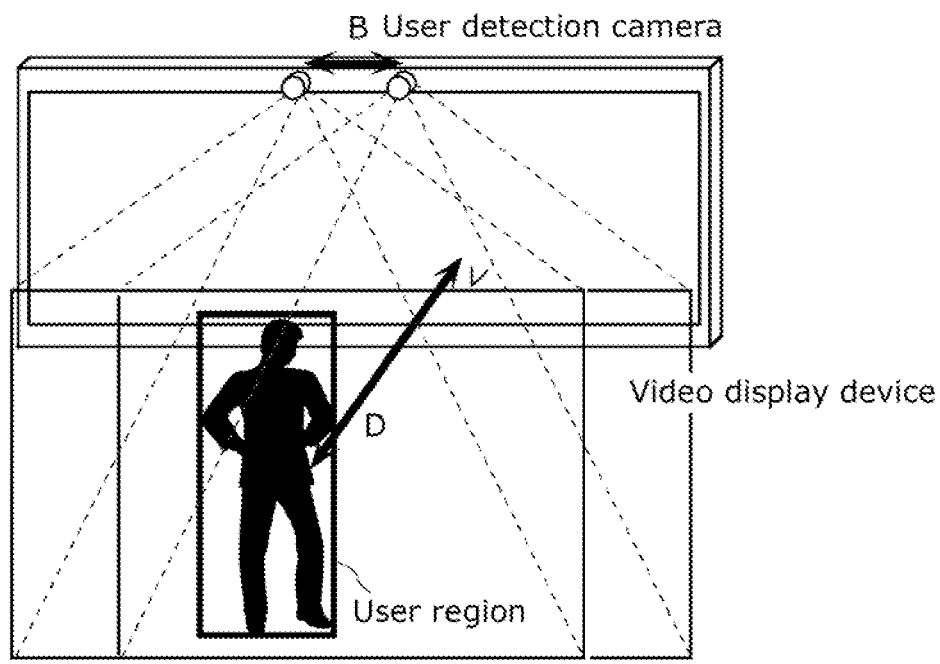
FIG. 3A is a diagram for explaining how to detect a position of a user and its three-dimensional position according to Embodiment 1 of the present invention.
Figure 3B:
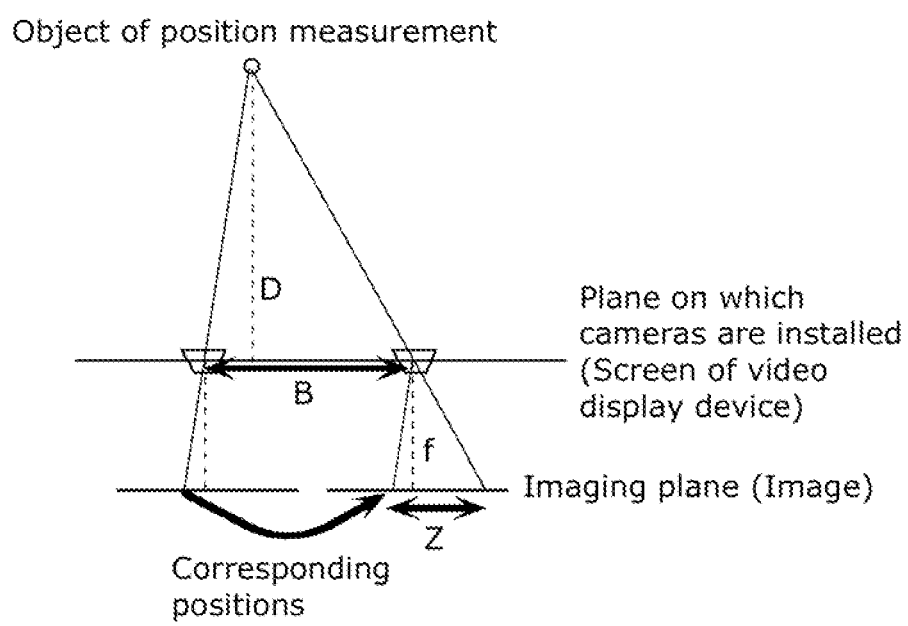
FIG. 3B is a diagram for explaining how to detect a position of a user and its three-dimensional position according to Embodiment 1 of the present invention.

FIGS. 3A and 3B are each a diagram showing a method for the user position detection unit 101 according to Embodiment 1 of the present invention to calculate the user position based on the principle of stereoscopy.

As shown in FIG. 3A, a pair of two user detection cameras 100 is mutually separated by a distance B and the cameras are installed in parallel with respect to the screen 111. The user position detection unit 101 calculates a distance D between the user and the screen 111 based on position gap of the user regions corresponding to two images almost simultaneously captured by each of the user detection cameras 100. Extraction of a region in which the user is present in the image captured by each of the user detection cameras 100 (user region), for example, can be realized by storing the image captured in advance by each of the user detection cameras 100 when the user is not present and by finding a difference from the image in which the user appears, Moreover, the user position detection unit 101 can find a face region of the user by detection of a face image and extract the face region as the user region.

FIG. 3B is a diagram which shows the principle of stereoscopy in which a distance D is determined between the user and the camera installation plane (screen 111), based on the user region corresponding to two images. Assuming that the user regions each corresponding to the images captured by two user detection cameras 100 are a position measurement object, the images of the user region are projected onto two imaging planes (images) as illustrated in FIG. 3B. Assuming that a gap on the images of the corresponding pictures is Z, the distance D between the user and the screen 111 can be obtained by $D=f \times B/Z$, based on a focal length f of the user detection camera 100 and a distance B between optical axes of the user detection camera 100. Moreover, the user position in a direction parallel with the screen 111 can be obtained based on a position of the user region in the image and the above described distance D. A relative position of the user with respect to the screen 111 obtained in this way is output from the user position detection unit 101.

It should be noted that if a distance image sensor or the like which outputs distance information with a Time of Flight principle is used for the user detection camera 100, the user position detection unit 101 can more easily calculate the user's relative position with respect to the screen 111 with the use of the distance information. In this case, the number of user detection cameras 100 may be one.

<First Direction Detection Unit>

The first direction detection unit 102 detects a direction of a gaze (hereafter, also referred to as gaze direction) from the image captured by the user detection camera 100 as the first direction indicating a direction in which the user is looking.

FIGS. 4A to 5C are diagrams which show a gaze detection method by the first direction detection unit 102 according to Embodiment 1 of the present invention.

A gaze direction is calculated based on a combination of an orientation of the face (hereafter also referred to as face orientation) and a direction of the black part in the eyes (hereafter also referred to an orientation of the black part of the eyes or a direction of the black part of the eyes). Therefore, the first direction detection unit 102 first estimates a three-dimensional face orientation of a person, next estimates a orientation of the black part of the eyes, and calculates a gaze direction through combining the two.

Figure 4A:
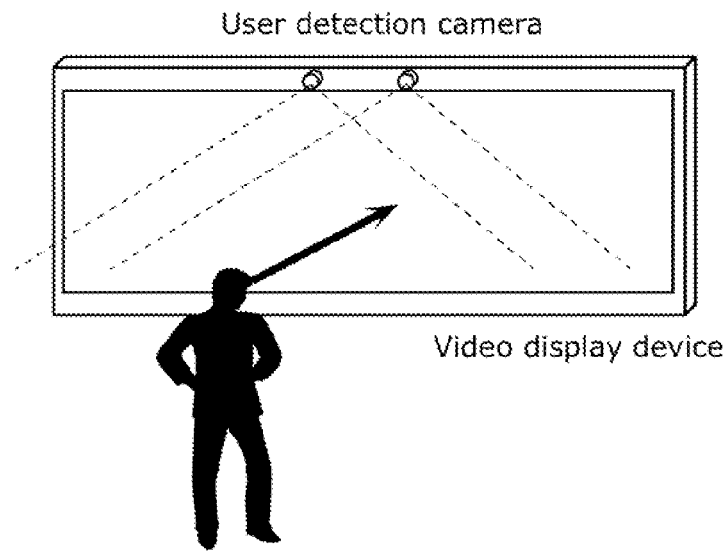
FIG. 4A is a diagram for explaining how to detect a face orientation or a gaze with an image according to Embodiment 1 of the present invention.

As shown in FIG. 4A, the first direction detection unit 102 first estimates the face orientation based on an image captured by the user detection camera 100. The face orientation can be estimated with the use of a method which will be described with reference to FIGS. 4B and 5A.

Figure 4B:
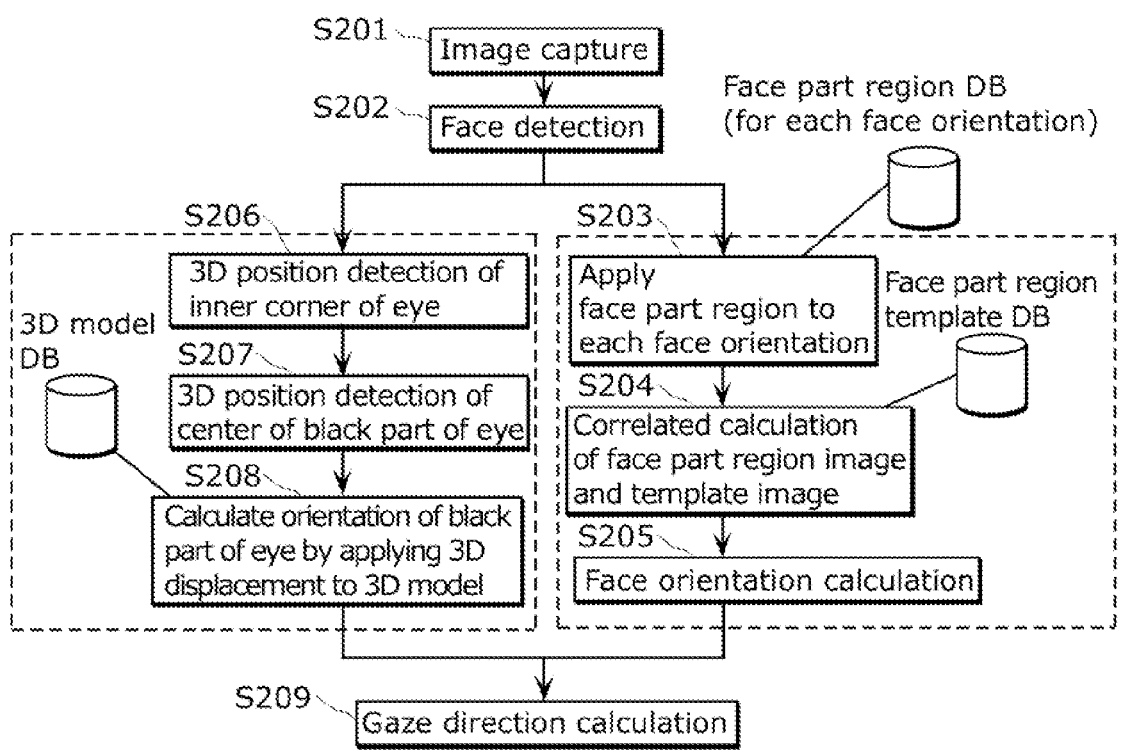
FIG. 4B is a flowchart for explaining how to detect a face orientation or a gaze with an image according to Embodiment 1 of the present invention.

FIG. 4B is a flowchart which shows an overall flow of a method for estimating a gaze direction. In the present embodiment, body parts such as eyes, nose, mouth, and the like in the detected face region are prepared in advance for each of the face orientations. In an example of FIG. 5A, regions of face part feature points in the front of the face orientation and plus or minus 20 degrees to the left and to the right are prepared. Moreover, template images clipped from a region surrounding each of the face part feature points are prepared.

First, the user detection camera 100 captures an image of the user in front of the screen 111 (S201). Then, the first direction detection unit 102 detects a face region from the captured image (S202). Next, the first direction detection unit 102 applies a region of the face part feature point corresponding to each of the face orientations (face part region) with respect to the detected face region (S203), and clips a region image of each of the face part feature points (face part region image). The first direction detection unit 102 calculates a correlation between the clipped region image and the already prepared template image (S204), provides a weight with the use of a ratio of correlation with respect to a degree of each face orientation, obtains a sum of the degree of each weighted face orientation (weight added sum), and determines the sum as the face orientation of the detected face (S205). In an example of FIG. 5A, the correlation with respect to the face orientation "+20 degrees" is 0.85, the correlation with respect to "0 degree" (forward orientation) is 0.14, and the correlation with respect to "−20 degrees" is 0.01. Accordingly, the face orientation is calculated as 16.8 degrees (=20×0.85+0×0.14−20×0.01).

Here, although the face part regions are correlation calculation targets, the whole of the face region may be a target for correlation calculation, for example, rather than being limited to the face part regions. Moreover, other examples of the face orientation detecting method include detecting the face part feature points such as eyes, nose, and mouth from a face image, and calculating the face orientation on the basis of the positional relationship between such face part feature points. As a method for calculating the face orientation on the basis of the positional relationship between the face part feature points, a three-dimensional model of the face part feature points prepared in advance may be rotated, enlarged, or reduced in size so as to achieve best matching with the face part feature points obtained from a single camera, and the face orientation may be calculated on the amount of rotation of the obtained three-dimensional model. Moreover, other examples of the method for calculating a face orientation based on the positional relationship between the face part feature points include utilizing images captured by two cameras based on the principle of stereoscopy, such as calculating a three-dimensional position of each face part feature point from deviation on the screen of the face part feature points between the respective images of the left and right cameras, and calculating the face orientation on the basis of the positional relationship between the face part feature points thus obtained. For example, a direction of a normal of a plane drawn on a three-dimensional coordinate points defined by the eyes and the mouth may be detected as the face orientation.

The first direction detection unit 102 estimates an orientation of the black part of the eyes after determining the face orientation. The direction of the black part of the eyes can be estimated with the use of the following method. An outline of a method for estimating the direction of the black part of the eyes will be described with reference to FIG. 4B, FIGS. 5B and 5C.

First, the calculation of the gaze direction reference plane will be described. The gaze direction reference plane in this method refers to a plane that serves as the basis for calculating the gaze direction, and coincides with a vertical plane of symmetry of the face. In this method, the first direction detection unit 102 calculates the vertical plane of symmetry of the face from a three-dimensional position of the inner canthus of both eyes, by using the fact that the position of the inner canthus fluctuates less compared with other face parts such as an outer canthus, corners of the mouth, and eyebrows, and is less likely to be erroneously detected.

Figure 5A:
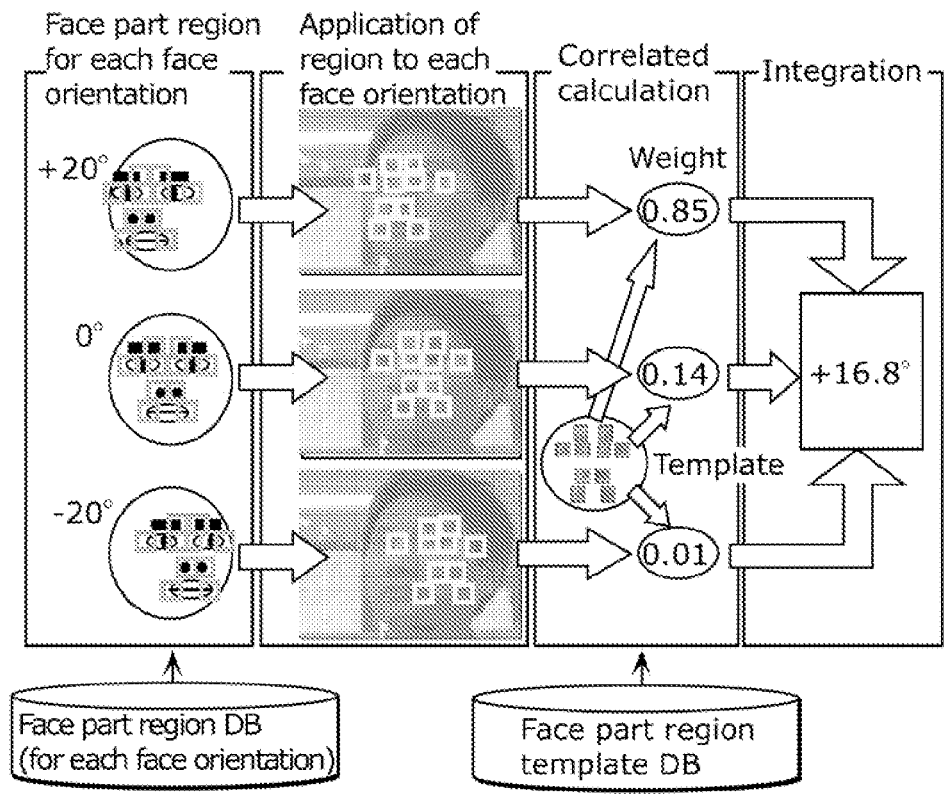
FIG. 5A is a diagram for explaining how to detect a face orientation with an image according to Embodiment 1 of the present invention.
Figure 5B:
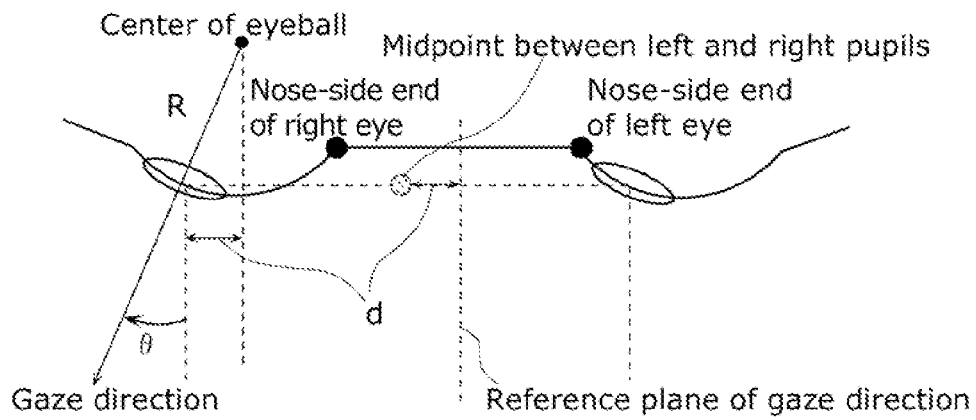
FIG. 5B is a diagram for explaining how to detect an orientation of the black part of the eyes with an image according to Embodiment 1 of the present invention.
Figure 5C:
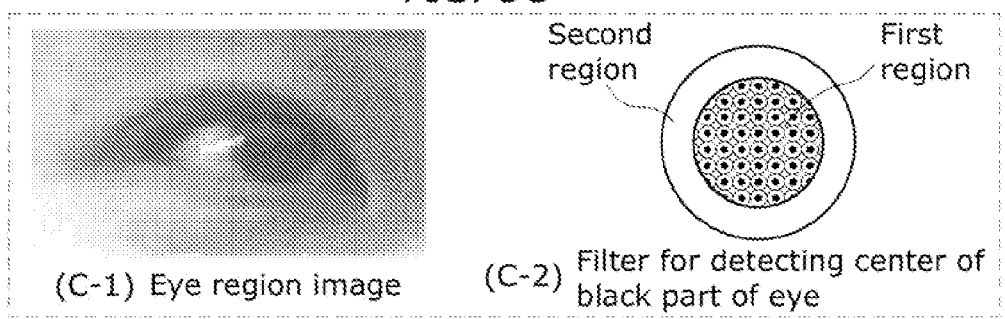
FIG. 5C is a diagram for explaining how to detect an orientation of the black part of the eyes with an image according to Embodiment 1 of the present invention.

The first direction detection unit 102 detects an inner canthus region of both eyes in each of the two images (stereoscopic images) captured by a stereoscopic camera, using a face detection module and a face part detection module. The first direction detection unit 102 then measures the three-dimensional position of the inner canthus of the respective eyes, by performing stereo measurement for the face detection module and the face part detection module (S206). As shown in FIG. 5B, the gaze direction reference plane is obtained as a vertical bisecting plane of a line having the end points at the three-dimensional positions of the inner canthus of the respective eyes that are detected.

The detection of the center of the black part of the eyes will be described. A person visually recognizes an object when light from the object reaches the retina through the pupil and the light is converted into an electrical signal, and the electrical signal is transmitted to the brain. Accordingly, the gaze direction can be detected with the position of the pupil. However, since the iris of Japanese people is black or brown, it is difficult to distinguish the pupil from the iris on the image. In this embodiment, therefore, the first direction detection unit 102 detects the center of the black part of the eyes rather than the center of the iris, because the center of the pupil and that of the black part of the eyes (iris) substantially coincide. The first direction detection unit 102 first detects the positions of the inner and outer canthui, detects, as a region of the black part of the eyes, a region where luminance is minimum in a region including the inner and outer canthui shown in (c-1) of FIG. 5C. The first direction detection unit 102 sets, as the region of the black part of the eyes, a black part center detection filter including a first region and a second region as shown in (c-2) of FIG. 5C. Then, the first direction detection unit 102 searches for the center of the circle that makes inter-region dispersion between luminance of pixels in the first region and that of the second region maximal, and determines a position indicated as a result of the search as the center of the black part of the eyes. Finally, the first direction detection unit 102 obtains the three-dimensional position of the center of the black part of the eyes through stereo measurement for the center of the black part of the eyes (S207).

The detection of the gaze direction will be described. The first direction detection unit 102 detects a gaze direction with respect to the front of the face (the direction of the black part of the eyes) with the use of the calculated gaze direction reference plane and the detected three-dimensional position of the center of the black part of the eyes. It is known that a size of eyeball is barely different among adults, and is approximately 24 mm in the case of Japanese people. Accordingly, provided that the position of the center of the black part of the eyes corresponding to a reference orientation (for example, a forward orientation) is known, the gaze direction with respect to the front of the face (orientation of the black part of the eyes) can be calculated by obtaining a displacement therefrom to the current position of the center of the black part of the eyes. In the conventional technique, calibration is necessary because the position of the center of the black part of the eyes orienting in the reference direction is not known. Conversely, in the present method, on the basis of the fact that when the user is oriented forward the midpoint between the centers of the black part of the respective eyes falls on the center of the face, that is, the gaze direction reference plane, a distance between the midpoint between the centers of the black parts of the eyes and the gaze direction reference plane is measured for the calculation of the gaze direction (direction of the black part of the eyes) with respect to the front of the face (S208).

In this method, the gaze direction with respect to the front of the face (orientation of the black part of the eyes) is obtained as a rotation angle θ in a left and right direction with respect to the front of the face.

The rotation angle θ is obtained by the following Expression 1.

[Math. 1]

$$\theta = \sin^{-1}\left(\frac{d}{R}\right) \quad \text{(Expression 1)}$$

Radius of eyeball (12 mm)

d: Distance between the gaze direction reference plane and the midpoint between the black parts of the left and right eyes The first direction detection unit 102 detects the gaze direction in a real space by combining the three-dimensional orientation of the face calculated based on the above described procedures and the orientation of the black part of the eyes in the face (S209), and outputs the gaze direction as the first direction.

It should be noted that the first direction output by the first direction detection unit 102 is not limited to a gaze direction. For example, the first direction detection unit 102 may output the face orientation as the first direction which indicates a direction in which the user is looking. In other words, the first direction detection unit 102 may detect the first direction which is a direction in which the user is looking, based on the body posture of the user. In other words, the first direction does not have to be a direction in which the user is looking but may be a direction which is a direction in which the user is estimated to be looking.

<Second Direction Detection Unit>

The second direction detection unit 103 detects, from the image captured by the user detection camera 100, an orientation of the user's body (hereafter referred to as body orientation) as a second direction indicating a direction in which the user is performing a pointing operation.

Figure 6A:
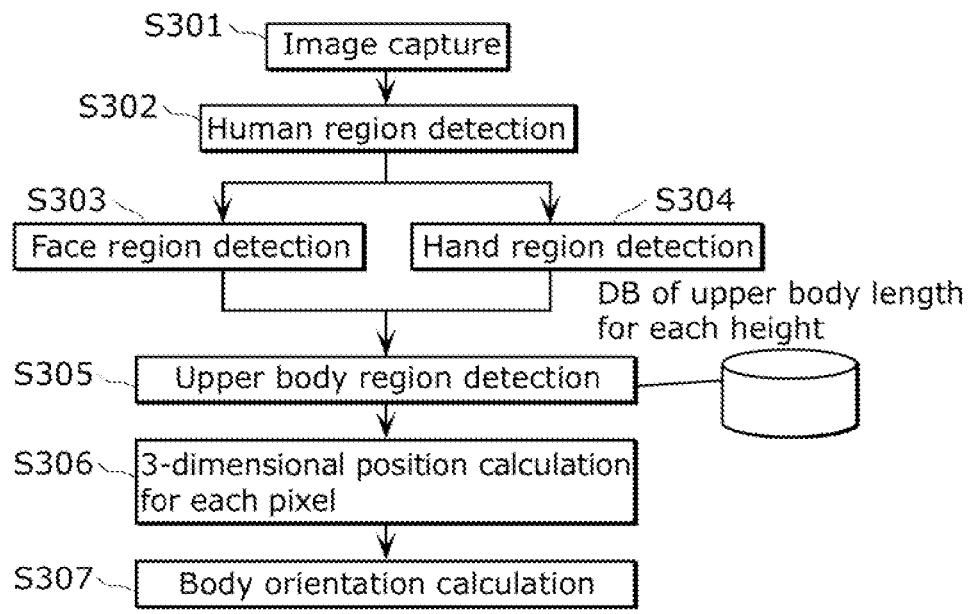
FIG. 6A is a flowchart for explaining how to detect a body orientation with an image according to Embodiment 1 of the present invention.

FIG. 6A is a flowchart showing a method for detecting a body orientation by the second direction detection unit 103 according to Embodiment 1 of the present invention. The body orientation in the present method is a straight direction connecting the right and left shoulders as indicated by a black dotted arrow in (b-1) of FIG. 6B.

The body orientation is calculated based on an orientation of the upper body (body region) obtained through subtracting the face region, the hand region, and the lower body region from the whole of the human region.

First, as shown in. FIG. 6A, the user detection camera 100 captures an image of the user in front of the screen 111 (S301). Then, the second direction detection unit 103 detects a human region from the captured image (S302). The detection of the human region, for example, can be realized by a method for using a difference between an image of a state in which the user is not present and an image of a state in which the user appears. Next, the second direction detection unit 103 performs the detection of the face region (S303) and the detection of the hand region (S304) with respect to the detected human region. Then, the second direction detection unit 103 calculates, from the detection result of the face region, a three-dimensional position of the face region by stereo measurement, and removes the lower body region from the human region based on a database in which one-on-one correspondence relationships between already prepared body heights and upper body heights are stored. Furthermore, the second direction detection unit 103 detects the upper body region by removing the surrounding region of the face region and the hand region (S305). A specific method for the detection of the hand region will be described in the coordinate input detection unit 104.

The second direction detection unit 103 detects an upper body region for each of the images captured by two cameras, calculates the three-dimensional positions included in the upper body region by stereo measurement (S306), and estimates the body orientation from the three-dimensional position for each of the pixels (S307). The body orientation, for example, can be estimated with the use of the following method. An outline of an estimation method will be described with reference to FIG. 6B.

Figure 6B:
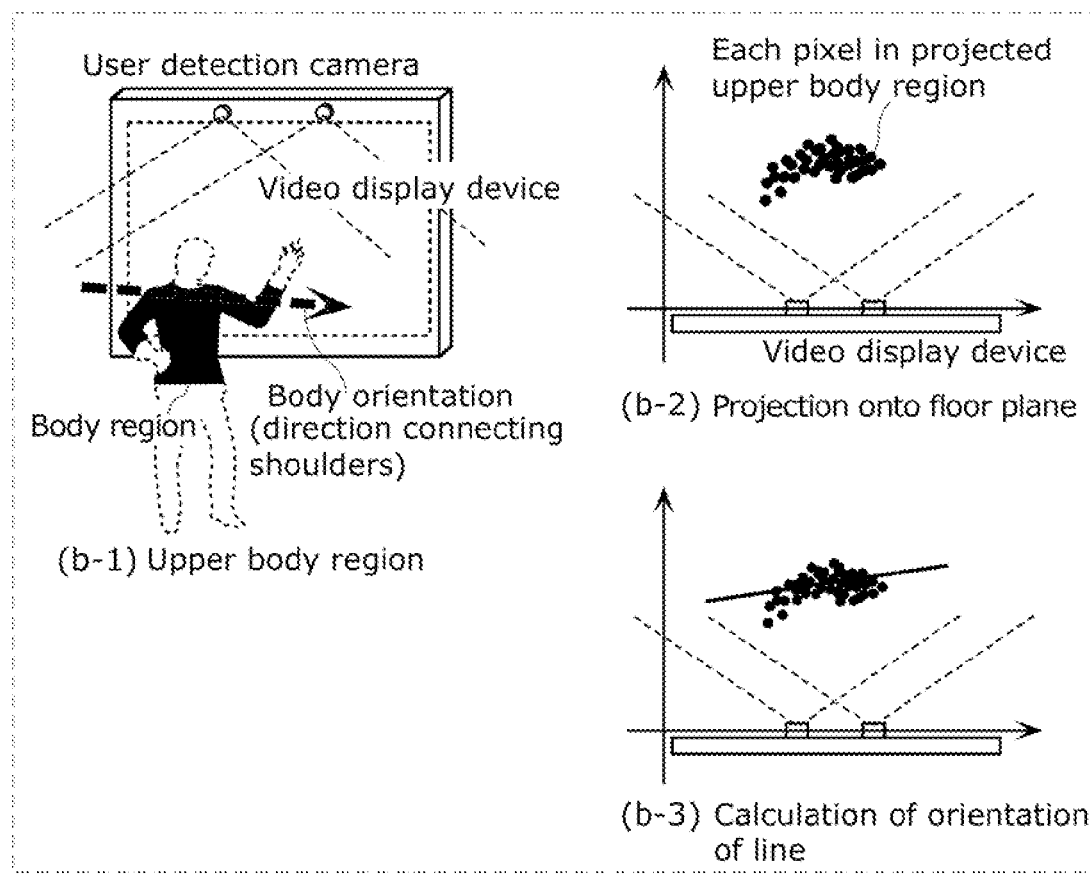
FIG. 6B is a diagram for explaining how to detect a body orientation with an image according to Embodiment 1 of the present invention.

First, each three-dimensional position for a corresponding one of the pixels included in the upper body region detected in (b-1) of FIG. 6B is projected onto the same plane as the plane which the user is standing on, as illustrated in (b-2) of FIG. 6B. Next, an orientation of a line is calculated with the use of the least square method as shown in (b-3) of FIG. 6B with respect to the projected plane, and the direction is detected as the body orientation. The second direction detection unit 103 outputs the body orientation as the second direction.

In this way, the second direction detection unit 103 detects, based on the body posture of the user, the second direction which is a direction in which the user is performing a pointing operation. Here, the direction in which the user is performing a pointing operation is a direction in which the user is naturally moving their hands near the front of the body as a pointing operation.

It should be noted that although the least square method is used here, the method is not limited to such. The second direction detection unit 103 may calculate an orientation of a line with the use of a line detection method such as Hough transform. Moreover, the second direction detection unit 103 may detect the body orientation not by projecting onto the floor plane but by using such method as a three-dimensional Hough transform with respect to three-dimensional information for each of the pixels.

It should be noted that in the present method, the second direction detection unit 103 detects the body orientation based on the orientation of the upper body region, but may detect the body orientation with an inverse kinematic solution based on the results of the detection of the face region and the detection of the hand region and a body joint model.

Moreover, the above described second direction detection unit 103 detects the body orientation as the second direction, but a hand movement in which the user is providing an instruction input to the video display device 112 also affects the direction of the screen 111, and therefore becomes a movement in an intermediate direction of the body orientation and the screen orientation (orientation in parallel with the screen). Therefore, the second direction detection unit 103 may detect the second direction based on not only the body posture of the user but also the direction of the screen 111 with respect to the position of the user. For example, the second direction detection unit 103 outputs (detects) an average value of the body orientation and the orientation of the screen 111 as the second direction. With this, the second direction detection unit 103 can detect, as the second direction, a direction which is adapted to a positional relationship between the user's position and the position of the screen. Moreover, the second direction detection unit 103 may store training results of directions in which the user is moving a hand by the body orientation and the orientation of the screen, and may detect the second direction based on the stored training results. With this, the second direction detection unit 103 can detect, as the second direction, a direction which is further adapted to the user's movement.

<Coordinate Input Detection Unit>

The coordinate input detection unit 104 detects, as an input coordinate, a coordinate indicating a three-dimensional position of the user's hand based on the image captured by the user detection camera 100. In the present embodiment, the coordinate input detection unit 104 is composed as an input coordinate detection unit.

Figure 7A:
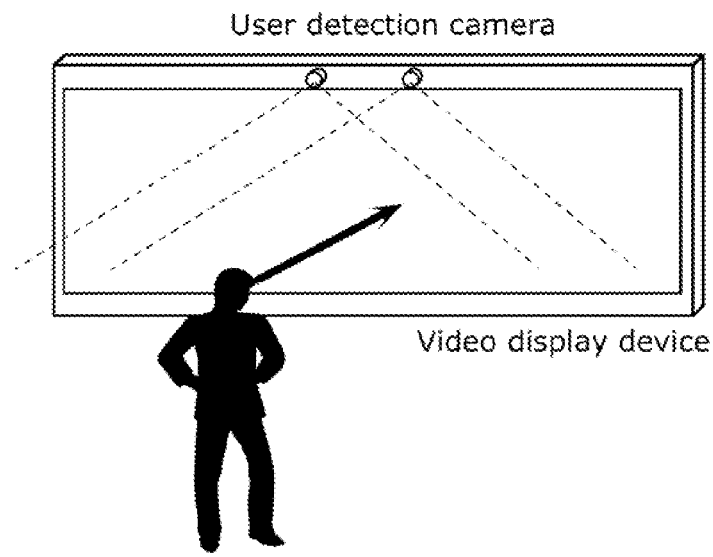
FIG. 7A is a diagram for explaining how to detect a hand with an image according to Embodiment 1 of the present invention.
Figure 7B:
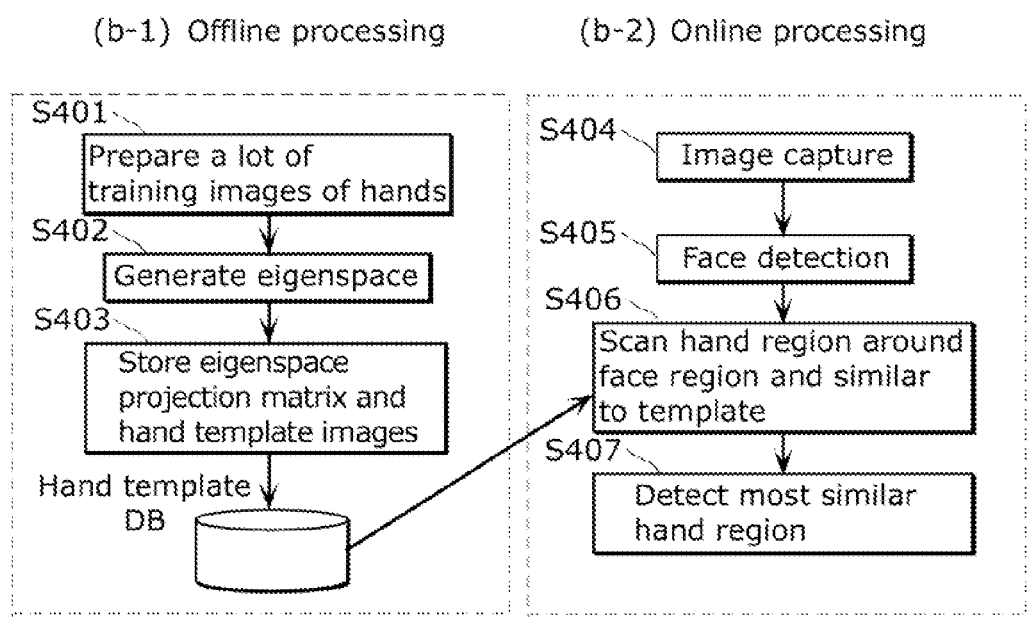
FIG. 7B is a flowchart for explaining how to detect a hand with an image according to Embodiment 1 of the present invention.

FIGS. 7A and 7B are each a diagram showing a method for detecting a hand by the coordinate input detection unit 104 according to Embodiment 1 of the present invention.

As shown in FIG. 7A, the coordinate input detection unit 104 first detects the face region from the image captured by the user detection camera 100, and detects the hand region surrounding the face region. There is the following method as the method for detecting the hand region. Hereafter, the method for detecting the hand region will be described with reference to FIG. 7B.

First, as an offline processing, the coordinate input detection unit 104 prepares a lot of training images of a hand to be detected (S401). Conditions such as a lighting environment and an orientation in the training images are provided to conform to the environment to be actually detected. Next, the coordinate input detection unit 104 generates, from the prepared training images, an eigenspace comprising a main component of a hand with the use of an analysis of the main component (S402). Moreover, the coordinate input detection unit 104 prepares a hand template image as a sample of a hand to be detected. The template image may be an average image of a hand that is prepared and an image of a hand in a plurality of states such as a form of a rock and a form of a paper, and an image of the right and the left hands. The coordinate input detection unit 104 stores projection matrix onto the generated eigenspace and hand template images in a hand template database (S403).

Next, an online processing for actual detection be described.

First, the user detection camera 100 captures an image of the user in front of the screen 111 (S404). The coordinate input detection unit 104 detects the face region from the captured image (S405).

When the face region is detected, the coordinate input detection unit 104 performs the detection of a hand in a search region surrounding the face region. The coordinate input detection unit 104, in the region surrounding the face, scans a region which is similar to the prepared hand template image with the use of the hand template image stored in the hand template database (S406). The region surrounding the face may be a region within a range of sizes which are determined in advance with respect to the face position. Moreover, a scan is performed only on a region in which the face and the depth distance are mutually short in the region surrounding the face by stereo measurement with the use of two cameras, and the search range may be reduced. Moreover, here, the coordinate input detection unit 104 detects a hand from the region surrounding the face, but the detection is not limited to such. The detection of a hand may be performed from the surrounding of the human region. As the calculation of similarity for matching, the clipped hand candidate region image and the hand template image are projected onto an eigenspace with the use of the already prepared matrix of projection onto an eigenspace, and the distances of the images on the eigenspace are compared. By comparing the distances in the space indicating the main component of the hand, detection can be performed with a decreased influence of noise such as a background. The coordinate input detection unit 104, within the search range, detects, as a hand region, a region in which a distance satisfies a predetermined threshold and the shortest distance to the hand template image is obtained (S407).

In the case where there is no region in which a distance satisfies the threshold in the search range, the coordinate input detection unit 104 ends the detection by determining that the user is not extending a hand.

The coordinate input detection unit 104 detects the above described hand region with respect to an image each captured by the two user detection cameras 100, calculates the three-dimensional position of the hand by stereo measurement, and outputs the position as the input coordinate of the hand. Moreover, in the case where the images of the right and left hands are prepared in the offline processing, the coordinate input detection unit 104 may output left and right hand identification information based on whether or not one of the left and right hand template images is matched. Moreover, the coordinate input detection unit 104 may further recognize the right hand and left hand of the user based on the images captured by the user detection camera 100, and may detect the input coordinate each for the left hand and the right hand that are recognized. In this case, a pointer with respect to each of the input coordinates of the right hand and the input coordinate of the left hand is displayed on the screen 111.

It should be noted that a template matching method is used in this example. But other hand detection methods such as boosting may be used.

Moreover, since the user is extending a hand to a direction toward the screen 111 at the time of an instruction input by the user, it is possible to use, for example, a method for detecting, as a hand, a region which is nearer to the screen 111 than the face region and the body region based on the distance information obtained by stereo measurement with the use of two cameras.

Moreover, the coordinate input detection unit 104 may detect the hand position based on not only the hand region detection method based on the images obtained from the user detection camera 100 but also a position coordinate of the coordinate input remote control 105 as indicated in the configuration example of FIG. 2. Hereafter, a method for detecting a hand position with the coordinate input remote control 105 according to Embodiment 1 of the present invention will be described with reference to FIGS. 8A and 8B.

Figure 8A:
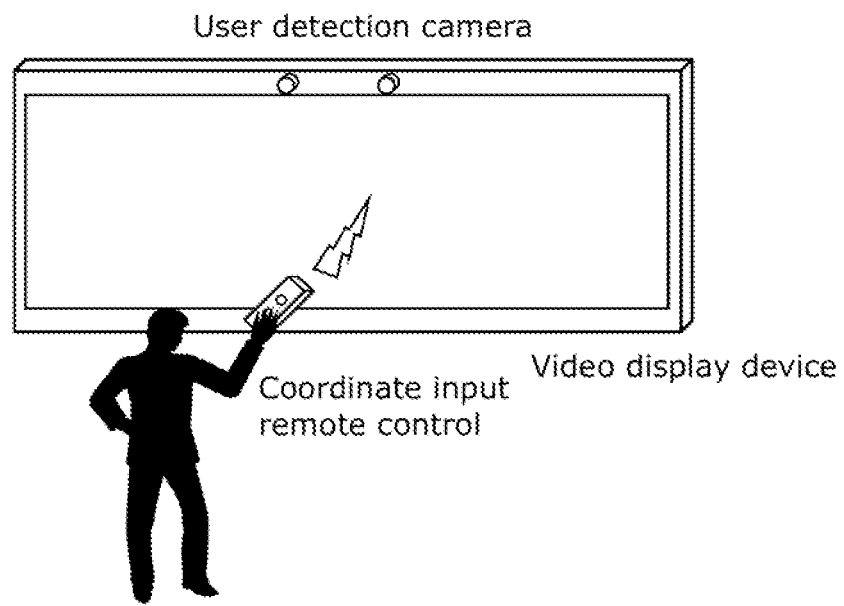
FIG. 8A is a diagram for explaining how to detect a hand with a coordinate input remote control according to Embodiment 1 of the present invention.

As shown in FIG. 8A, the user can perform a coordinate input operation in a state where the user is holding the coordinate input remote control 105 by hand.

Figure 8B:
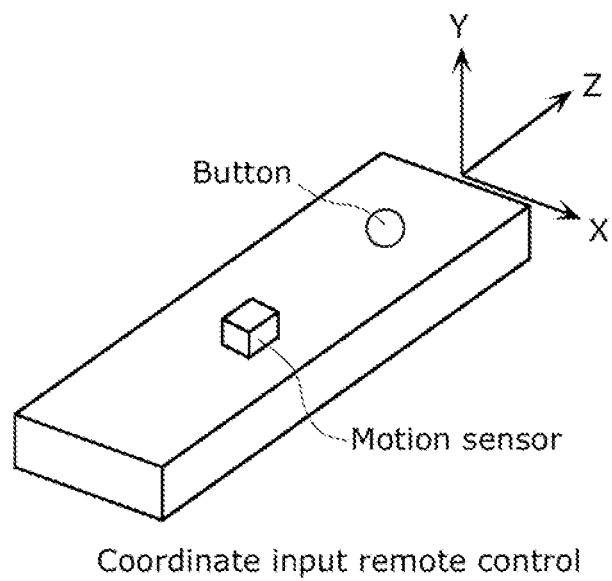
FIG. 8B is an external view of a coordinate input remote control according to Embodiment 1 of the present invention.

FIG. 8B is a diagram showing the configuration of the coordinate input remote control 105. The coordinate input remote control 105 includes a motion sensor which detects the movement of a user's hand holding the remote control and a position detection unit 1052 which detects the position of the coordinate input remote control 105 from the output of the motion sensor. Moreover, as shown in FIG. 8B, the coordinate input remote control 105 may include a button on the surface.

The motion sensor included in the coordinate input remote control 105 comprises by the inclusion of one of an acceleration sensor, an angular acceleration sensor (rate gyro), and a geomagnetic sensor (electronic compass), or a combination of two or all of them. For example, the acceleration sensor detects acceleration with respect to a predetermined axis, and detects acceleration with respect to each of the three axes of X axis, Y axis, and Z axis shown in FIG. 8B which are orthogonal to each other. Then, when the user changes the position of the coordinate remote control 105 while holding the coordinate input remote control 105 by moving the wrist and the arm, the position detection unit 1052 calculates the position coordinate of the coordinate input remote control 105 based on an output value of the motion sensor and output the position coordinate to the coordinate input detection unit 104. The coordinate input detection unit 104 detects, as the above described input coordinate, the position coordinate which is output by the coordinate input remote control 105.

Moreover, only in the case where the coordinate input remote control 105 detects that the button is pushed down by the button input unit 1051, the coordinate input remote control 105 may output the position coordinate of the coordinate input remote control 105.

<Gaze Position Calculation Unit>

The gaze position calculation unit 106 calculates the user's gaze position on the screen based on the user's position detected by the user position detection unit 101 and the first direction detected by the first direction detection unit 102.

Figure 9:
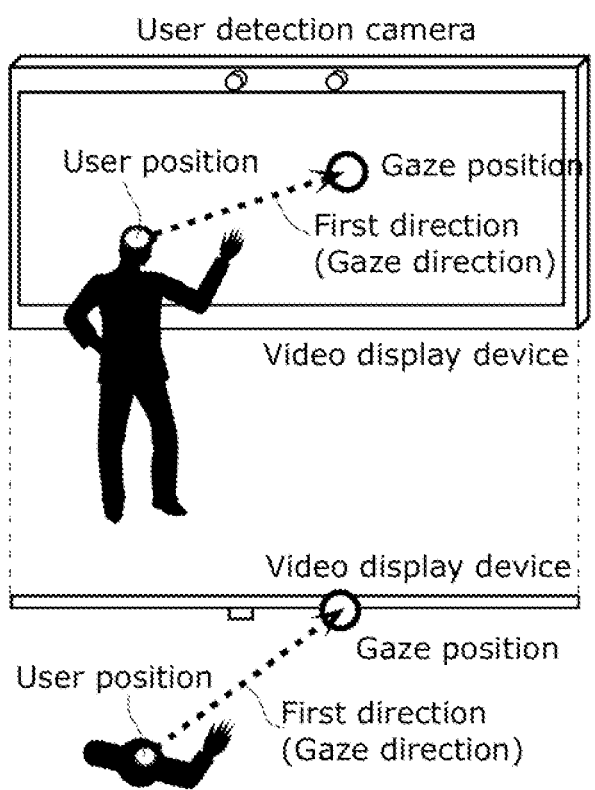
FIG. 9 is a diagram for explaining how to calculate a gaze position on the screen according to Embodiment 1 of the present invention.

FIG. 9 is a diagram showing how to calculate a gaze position on the screen by the gaze position calculation unit 106 according to Embodiment 1 of the present invention. It should be noted that in FIG. 9, the positional relationship between the user and the screen 111 is indicated from the front and above. The gaze position calculation unit 106 can calculate the gaze position in which the user is gazing on the screen 111 by finding a position in which a vector of the face orientation or the gaze direction with respect to the position of the user's face intersects the screen 111.

<Reference Coordinate Group Calculation Unit>

The reference coordinate group calculation unit 107 calculates, as a reference coordinate group, a reference line in the space which is a line corresponding to a gaze position and connects the user and the screen 111, based on the user's position detected by the user position detection unit 101 and the first direction detected by the first direction detection unit 102. In other words, in the present embodiment, the reference coordinate group calculation unit 107 is composed as a reference line calculation unit. Moreover, the reference line is a line which is indicated by arrangement of a plurality of reference coordinates (reference coordinate group).

Figure 10:
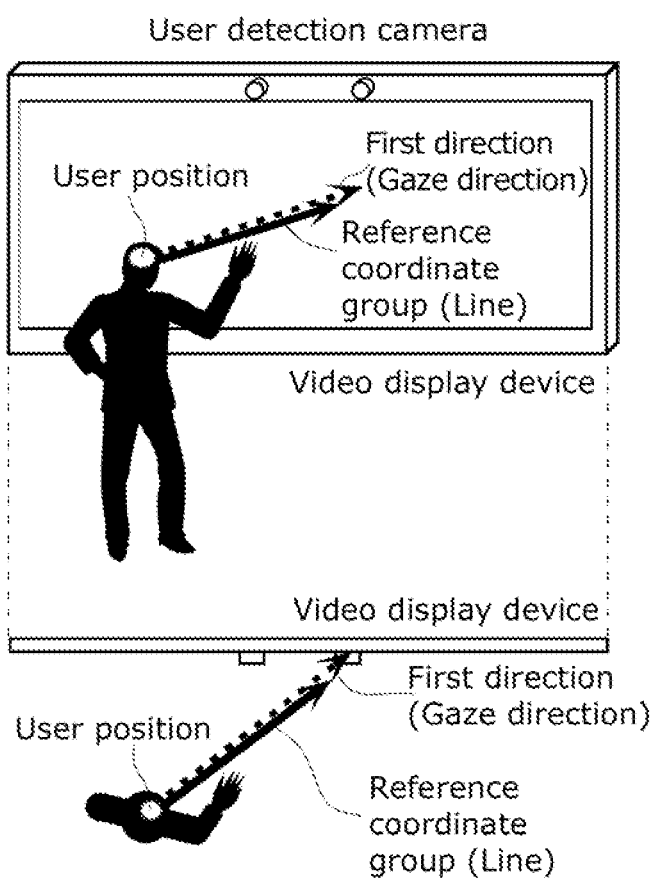
FIG. 10 is a diagram for explaining how to calculate a reference coordinate group according to Embodiment 1 of the present invention.

FIG. 10 is a diagram showing how to calculate a reference coordinate group in the space by the reference coordinate group calculation unit 107 according to Embodiment 1 of the present invention. It should be noted that in FIG. 10, as similarly to FIG. 9, the positional relationship between the user and the screen 111 is indicated from the front and above. The reference coordinate group is in this method is a coordinate group in the space which corresponds to the user's gaze position on the screen 111 calculated by the gaze position calculation unit 106. The reference coordinate group calculation unit 107 calculates a vector of one of the gaze direction and the face orientation with respect to the position of the user's face as the reference coordinate group shown in a black solid arrow in FIG. 10. In other words, the reference coordinate group calculation unit 107 calculates, as the reference coordinate group, a set of coordinates indicating positions on a line which is extending from the user's position to the first direction.

It should be noted that in the above described method, the reference coordinate group detection unit 107 calculate only one kind of a coordinate group. But the coordinate group in the space corresponding to the user's gaze position on the screen shows a difference to some extent according to the left and right hands. Therefore, two or more kinds of reference coordinate groups may be calculated. For example, a vector of the gaze direction with respect to a position of about 10 centimeters right from the position of the user's face may be calculated as a reference coordinate group for the right hand, and a vector of the gaze direction with respect to a position of about 10 centimeters left from the position of the user's face may be calculated as a reference coordinate group for the left hand. In other words, the reference coordinate group calculation unit 107 may calculate, as the reference coordinate group, a set of coordinates indicating positions on a line which is extending from a position distant in the second direction by the user's position and a predetermined distance to the first direction.

<Offset Amount Calculation Unit>

The offset amount calculation unit 108 calculates an offset amount from the gaze position of the user on the screen 111, based on the reference coordinate group calculated by the reference coordinate group calculation unit 107, the second direction detected by the second direction detection unit 103, and the hand position coordinate (input coordinate) detected by the coordinate input detection unit 104, In other words, the offset amount calculation unit 108 calculates a distance of the second direction between the reference line (reference coordinate group) and the input coordinate as an offset amount with respect to the gaze position in a first screen prescription direction along the screen 111. Here, the first screen predetermined direction is, for example, a horizontal direction. Furthermore, the offset amount calculation unit 108 calculates a distance of a third direction between the reference line (reference coordinate group) and the input coordinate as another offset amount with respect to the gaze position in a second screen prescription direction along the screen 111. Here, the third direction is a direction different from the first and the second directions, and is a vertical direction, for example. Moreover, the second screen predetermined direction is a direction different from the first screen predetermined direction, and is a direction perpendicular to the first screen predetermined direction (vertical direction).

Figure 11A:
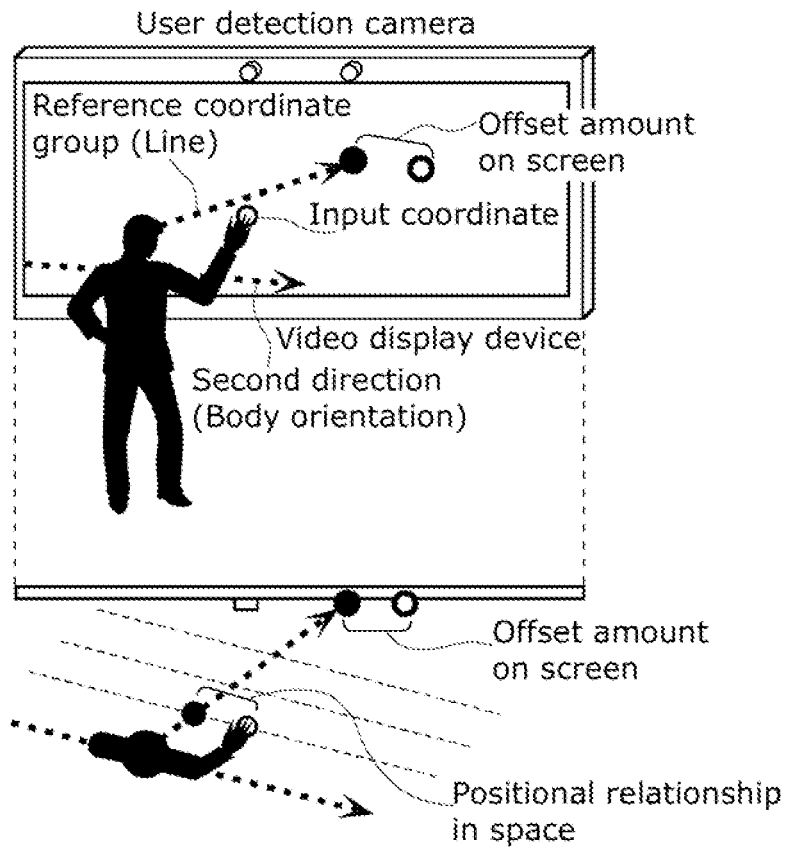
FIG. 11A is a diagram for explaining how to calculate an offset amount according to Embodiment 1 of the present invention.

FIG. 11A is a diagram showing how to calculate an offset amount on the screen 111 by the offset amount calculation unit 108 according to Embodiment 1 of the present invention. It should be noted that in FIG. 11A, as similarly to FIG. 9, the positional relationship between the user and the screen 111 is indicated from the front and above. The offset amount calculation unit 108 calculates an offset amount from the user's gaze position on the screen 111 by transforming a three-dimensional spatial positional relationship between the reference coordinate group and the position coordinate of a hand into a two-dimensional planar positional relationship. Hereafter, an outline of a method for calculating the offset amount will be described with reference to FIG. 11B.

Figure 11B:
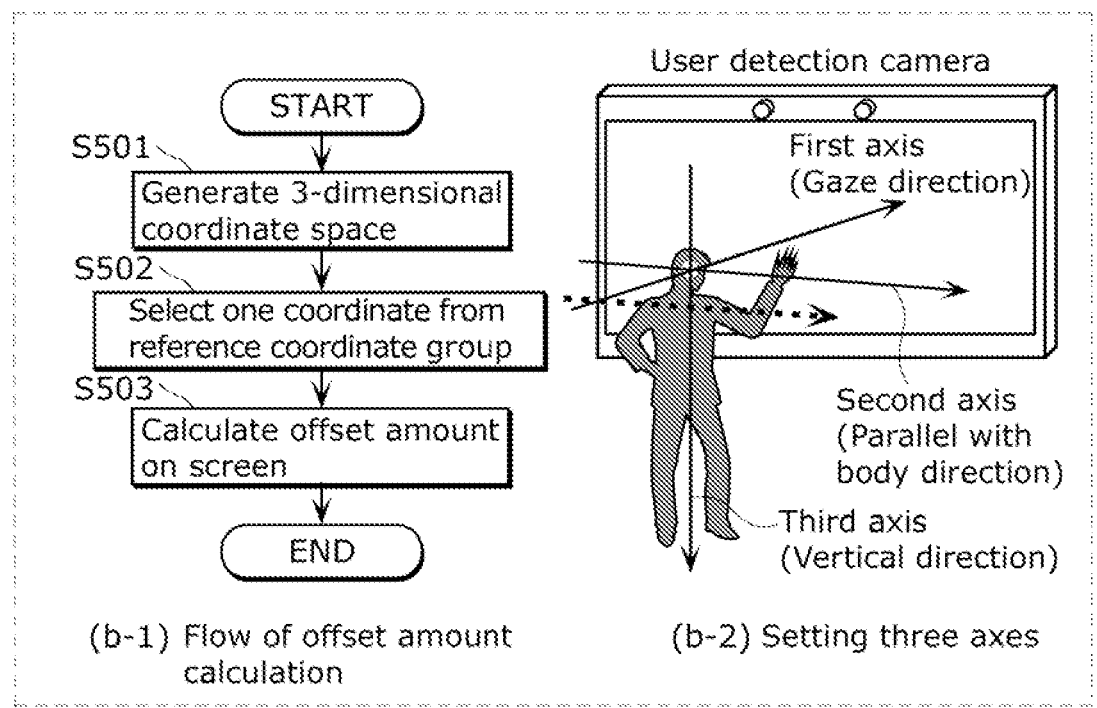
FIG. 11B is a diagram for explaining how to calculate an offset amount according to Embodiment 1 of the present invention.

FIG. 11B, in (b-1), shows a flowchart showing a method for calculating an offset amount. In the case where the user moves a hand to operate a pointer on the screen 111 by an instruction input, the user mainly moves a hand in a direction parallel with a body orientation. Therefore, first, as shown in (b-2) of FIG. 11B, the offset amount calculation unit 108 determines that the position of the user's head detected by the user position detection unit 101 is an original point, the gaze direction detected by the first direction detection unit 102 (first direction) is the first axis, the body orientation detected by the second direction detection unit 103 is the second axis, and the vertical direction is the third axis, in order to generate a three-dimensional coordinate space (S501). Next, the offset amount calculation unit 108 generates a post-transform coordinate by transforming input coordinate which is a hand position coordinate detected by the coordinate input detection unit 104 into a coordinate in the generated three-dimensional coordinate space. Then, the offset amount calculation unit 108 selects, from among the reference coordinate group calculated from the reference coordinate group calculation unit 107, a coordinate whose coordinate value regarding the first axis matches the coordinate value regarding the first axis of the transformed coordinate, as a reference coordinate (S502). Then, the offset amount calculation unit 108 calculates each of the distance in the second axis direction between the transformed coordinate and the reference coordinate and the distance in the third axis direction between the transformed coordinate and the reference coordinate as an offset amount of a horizontal direction (first screen predetermined direction) from the user's gaze position on the screen 111 and an offset amount of a vertical direction (second screen predetermined direction) from the user's gaze position on the screen 111, respectively (S503).

In this way, the offset amount calculation unit 108 selects, from the reference coordinate group, a coordinate corresponding to the input coordinate in the first direction as the reference coordinate. Then, the offset amount calculation unit 108 calculates an offset amount with respect to the gaze position on the screen 111 based on a distance in the second direction between the selected reference coordinate and the input coordinate, and a distance in the vertical direction. In other words, the offset amount calculation unit 108 calculates an offset amount with respect to the gaze position on the screen 111 based on the distance in the second direction between the position indicated by the input coordinate and the user's position, and the distance in the vertical direction.

It should be noted that in the above described method, the offset amount calculation unit 108 generates the three-dimensional coordinate space by determining the vertical direction as the third axis, but it is not limited to such. The offset amount calculation unit 108 may detect a direction from the user's head to the abdominal region and then generate the three-dimensional coordinate space by determining this direction as the third axis.

<Pointer Display Position Calculation Unit>

The pointer display position calculation unit 109 calculates a display position of a pointer on the screen 111 corresponding to the position of the user's hand detected by the coordinate input detection unit 104, based on the user's gaze position on the screen 111 calculated by the gaze position calculation unit 106 and the offset amount on the screen 111 calculated by the offset amount calculation unit 108. In other words, the pointer display position calculation unit 109 calculates, as the display position, a position in which a pointer moves from the gaze position by the offset amount. More specifically, the pointer display position calculation unit 109 calculates, as the display position of the pointer displaying on the screen 111, a position on the screen 111 in which a distance of a horizontal direction between the gaze position (first screen predetermined direction) is the offset amount in the horizontal direction and which a distance of a vertical direction between the gaze position (second screen predetermined direction) is the offset amount in the vertical direction (another offset amount).

As described above, the instruction input device 10 according to the present embodiment can calculate the display position of the pointer based on a direction in which the user is looking and a direction in which the user is performing a pointing operation. Therefore, the instruction input device 10 can keep unchanged a positional relationship between a hand which the user is extending in a gaze direction and the pointer corresponding to the hand on the screen. Furthermore, the instruction input device 10 can calculate the display position of the pointer such that an amount of movement of the pointer on the screen is unchanged with respect to an amount of movement of the user's hand. As a result, it is possible to implement an instruction input device which is easy for the user to understand and operate intuitively.

Figure 11C:
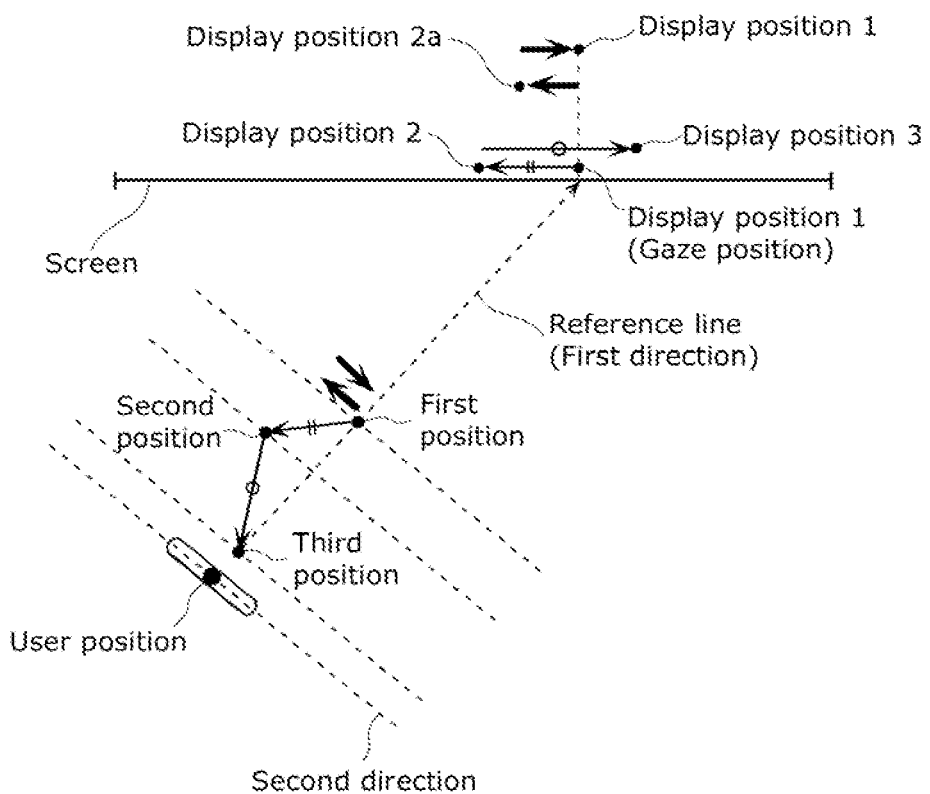
FIG. 11C is a diagram for explaining an effect of the instruction input device according to Embodiment 1 of the present invention.
Figure 11D:
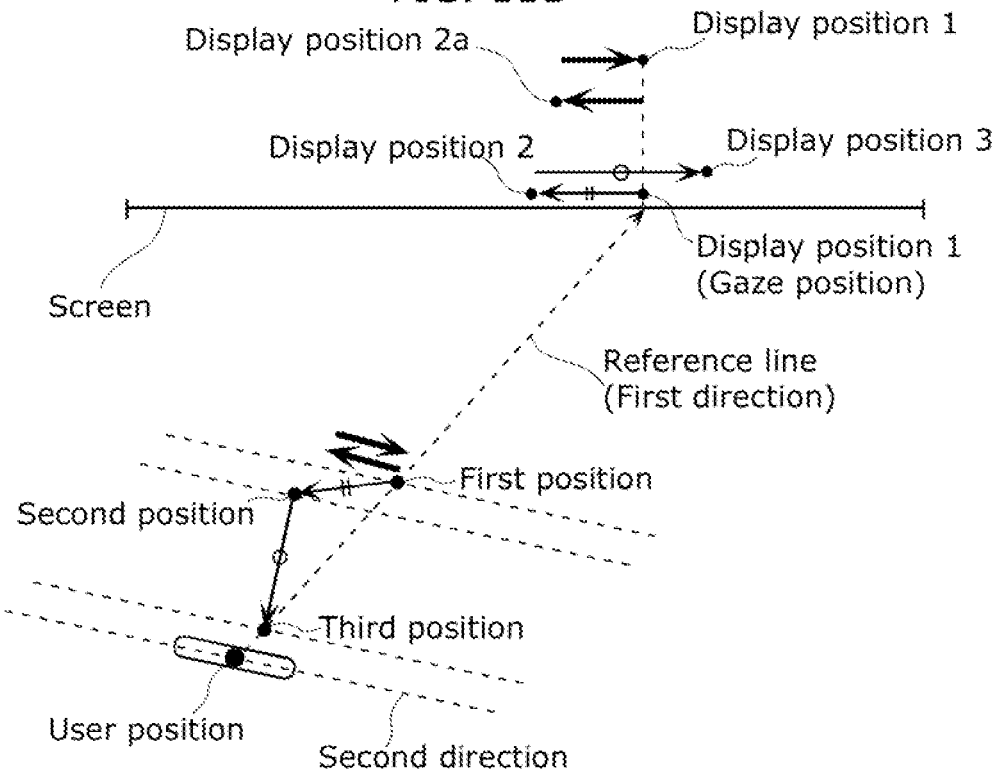
FIG. 11D is a diagram for explaining an effect of the instruction input device according to Embodiment 1 of the present invention.

FIGS. 11C and 11D are each a diagram for explaining the effect of the instruction input device 10 according to the present embodiment.

For example, the user extends a hand on the first axis along a direction in which the user is looking (first direction). In this case, the conventional instruction input device changes the display position of the pointer according to the hand position on the first axis. Therefore, the instruction input device 10 according to the present embodiment, as shown in FIG. 11C, calculates a distance in the second direction between the reference line and the input coordinate which is the hand position as an offset amount with respect to the gaze position in the horizontal direction, and calculates, on the screen, a position in which a distance of the horizontal direction between the gaze position is an offset amount as the display position of the pointer displayed on the screen. Therefore, if the user extends a hand on the first axis which is the reference line, the offset amount is zero regardless of the hand position on the reference line, and the pointer can be displayed on the same position as that on the screen (gaze position).

Moreover, for example, as shown in FIG. 11C, the user moves the hand extended to the first position on the first axis to the second position deviating from the first axis, and further moves the hand to the third position on the first axis. In this case, since the user returns the hand to on the first axis along the direction in which the user is looking (first direction), it is assumed that the pointer returns to on the display position 1 when the hand is on the first position. However, there are cases where the conventional instruction input device does not cause the pointer to return to the display position 1. In other words, the conventional instruction input device tries to move the pointer by a distance in which the hand has moved. Therefore, if the distance between the first position and the second position is shorter than the distance between the second position and the third position, the pointer on the screen moves to the display position 3 by passing the original display position 1 after moving from the display position 1 to the display position 2. Therefore, the instruction input device 10 according to the present embodiment, as described above, calculates a distance of the second direction between the reference line and the input coordinate which is the hand position as an offset amount with respect to the gaze position in the horizontal direction, and calculates, on the screen, a position in which a distance in the horizontal direction with the gaze position is the offset amount as the display position of the pointer displayed on the screen. As a result, even if the user moves a hand as described above, it is possible to move the pointer on the screen from the display position 1 (gaze position) to the display position 2a and then return the pointer to the original display position 1 (gaze position). In this way, in the present embodiment, the display position of the pointer can be calculated such that the positional relationship is unchanged between the hand extended by the user in a direction in which the user is looking and the pointer corresponding to the hand on the screen.

Moreover, in an example of FIG. 11C, an angle between the first direction which is a gaze direction and the second direction which is a body orientation is perpendicular. However, in the instruction input device 10 according to the present embodiment, as shown in FIG. 11D, even if the angle between the first direction and the second direction is not perpendicular, the same effect as the above described effect can be generated. In other words, in the instruction input device 10 according to the present embodiment, even in the case where there is a gap of the gaze orientation with respect to the body orientation or there is a gap of the body orientation with respect to the gaze orientation, the display position of the pointer can be calculated in consideration of these orientation gaps. As a result, the display position of the pointer can be calculated such that the correspondence relationship between the amount of movement of a hand substantially affected by the body orientation and the amount of movement of the pointer on the screen is unchanged, in other words, the amount of movement of a hand matches or almost matches the amount of movement of the pointer. With this, it is possible to implement an instruction input device which is easy for the user to understand and operate intuitively.

It should be noted that the instruction input device 10 according to the present embodiment calculates not only the offset amount in the horizontal direction on the screen but also the offset amount in the vertical direction as similarly to the horizontal direction, and therefore generates the effect, with respect to the display of the pointer in the vertical direction, similar to the effect generated by the display of the pointer in the above described horizontal direction.

[Embodiment 2]

Next, Embodiment 2 of the present invention will be described.

<Configuration>

Figure 12:
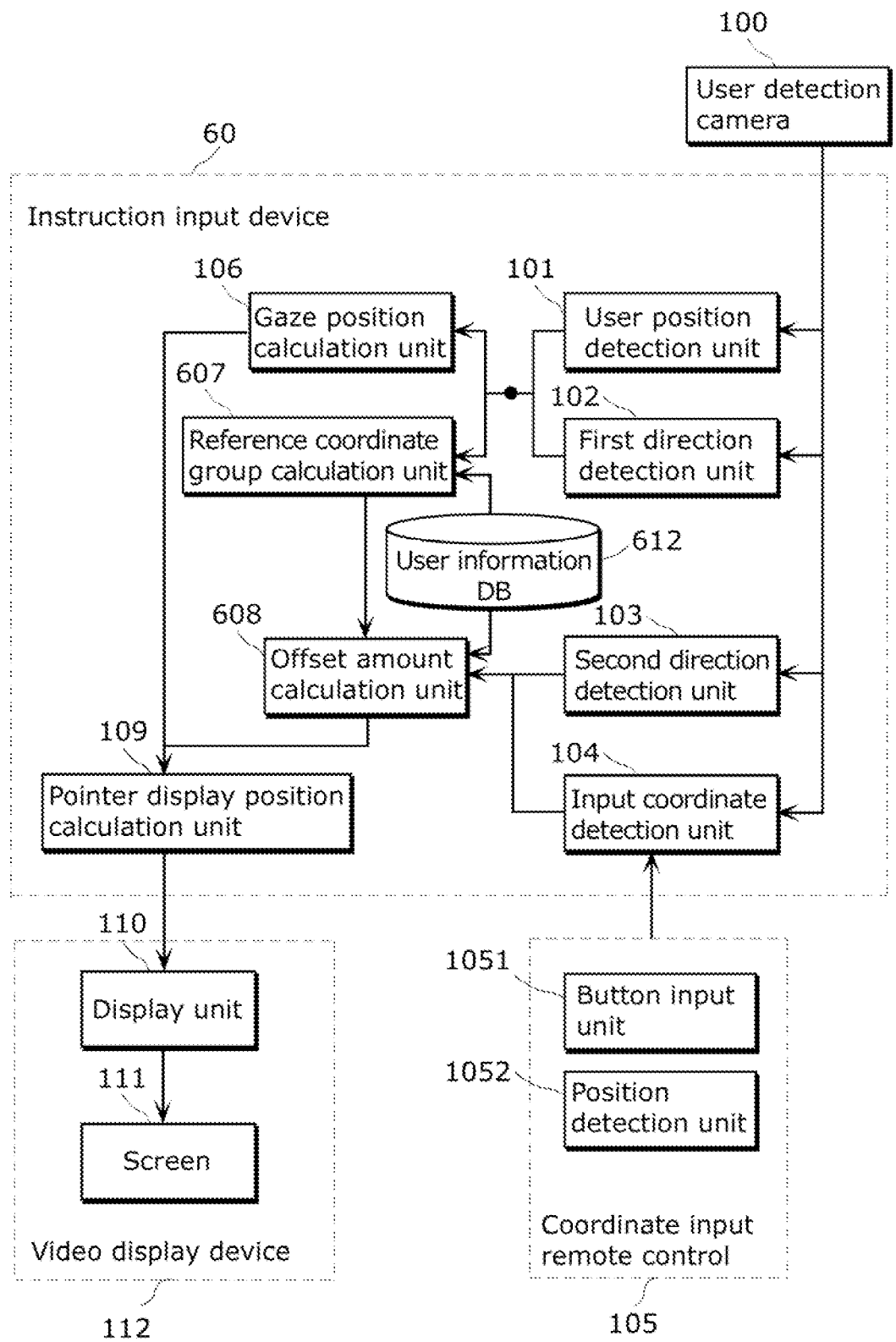
FIG. 12 is a main functional block diagram of the instruction input device according to Embodiment 2 of the present invention.

FIG. 12 is a diagram showing a configuration of an instruction input device 60 according to Embodiment 2 of the present invention. Although the configuration according to the present embodiment is almost identical to the configuration according to Embodiment 1, the difference from Embodiment 1 is that Embodiment 2 includes a user information database (DB) 612. Hereafter, the description will be focused on constituent elements operating based on the user information DB 612, and a detailed description about the same constituent elements as the elements in Embodiment 1 (constituent elements with the same reference signs as those of FIG. 2) will be omitted.

Figure 13:
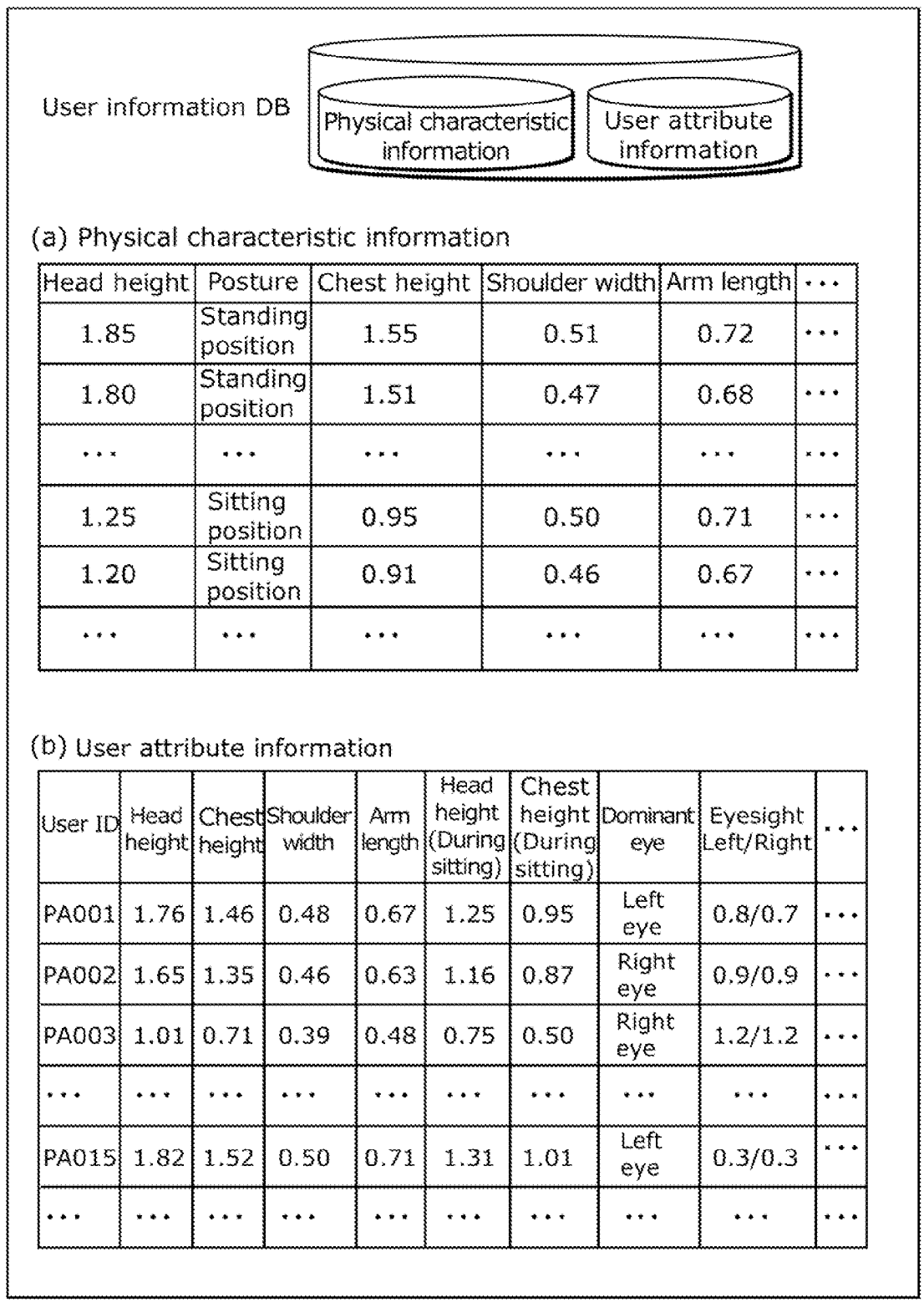
FIG. 13 is a diagram for explaining a user information database according to Embodiment 2 of the present invention.

FIG. 13 is a diagram showing an outline of data structure of the user information database (DB) 612. The instruction input device 60 includes the user information DB 612, and the user information DB 612 is a database for storing physical characteristic information, user attribute information, and the like.

The physical characteristic information stored in the user information DB 612 indicates human average body measurements, specifically including information about the chest height with respect to the head height, the shoulder width, the arm's length, and the like. Moreover, it is possible to include information about the chest height with respect to the head height during sitting.

The user attribute information stored in the user information DB 612 indicates already registered body measurements for each of the users, specifically including information about the head height, the chest height, the shoulder width, and the arm's length for each of the registered users. Moreover, it is possible to include information about the head height and the chest height during sitting. Moreover, in addition to the information about the body measurements, information about the user's dominant eye, the user's eyesight, and the like may be included. In this way, the user information DB 612 stores information indicating a correspondence relationship between the user's head position and the user's chest position, information indicating a correspondence relationship between the users head position and the user's arm length, information indicating the chest position for each of the users, or information indicating the arm length for each of the users.

<Motion>

Hereafter, the functions of a reference coordinate group calculation unit 607 and an offset amount calculation unit 608 in FIG. 12 will be described.

<Reference Coordinate Group Calculation Unit>

The reference coordinate group calculation unit 607 calculates a reference coordinate group on the space based on the user's position detected by the user position detection unit 101, the first direction detected by the first direction detection unit 102, and information about the chest height obtained from the user information DB 612 (information indicating a correspondence relationship between the user's head position and the user's chest position).

Figure 14A:
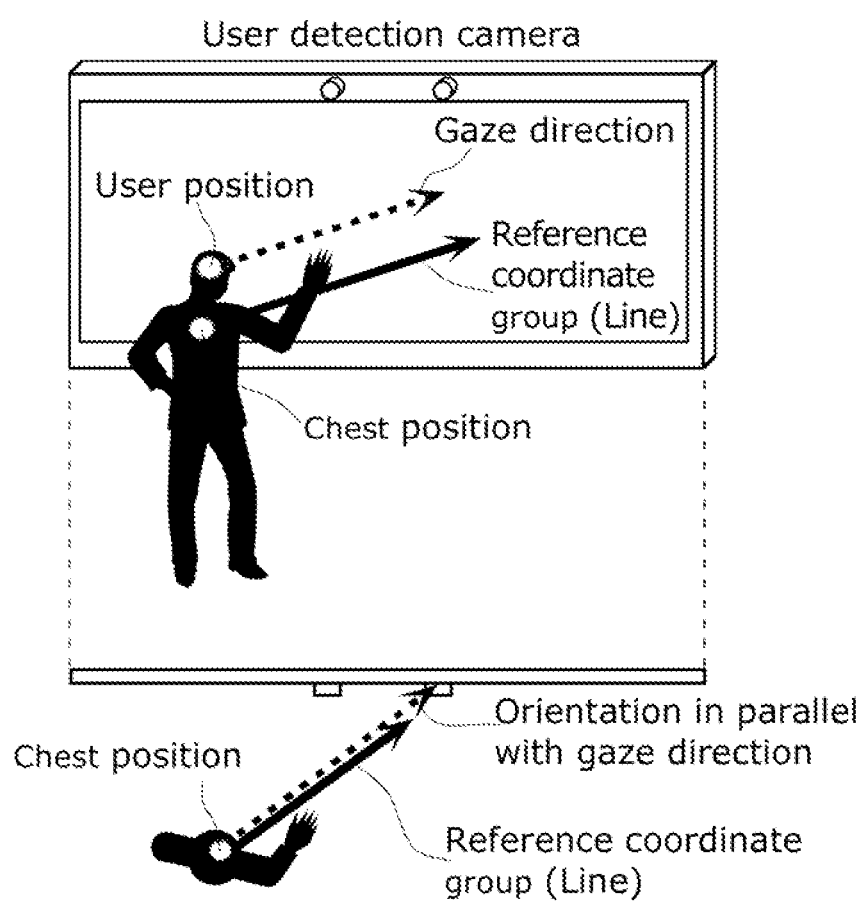
FIG. 14A is a diagram for explaining how to calculate a reference coordinate group based on a user information database according to Embodiment 2 of the present invention.

FIG. 14A is a diagram showing a method for calculating a plurality of reference coordinates by the reference coordinate group calculation unit 607 according to Embodiment 2 of the present invention. It should be noted that in FIG. 14, the positional relationship between the user and the screen 111 is indicated from the front and above. In the case where a pointer is displayed in a direction of the user's gaze direction, the pointer on the screen is masked by the extension of a hand by the user to the gaze direction. Therefore, it is a natural posture for the user to extend the hand to a position a bit lower than the gaze direction. Therefore, the reference coordinate group calculation unit 607 obtains the user's chest position (height) from the physical characteristic information stored in the user information DB 612 based on the user's head position detected by the user position detection unit 101, and calculates the position of the gaze direction with respect to the position of the user's chest position or a set of coordinates indicating the position on a vector of the face orientation, as a reference coordinate group (reference line) as shown in a black solid arrow of FIG. 14A

It should be noted that in the above described method, the reference coordinate group calculation unit 607 calculates, as a reference coordinate group, a set of a plurality of coordinates indicating the positions on a vector in the gaze direction with respect to the user's chest position. But the reference coordinate group calculation unit 607 may calculate, as the reference coordinate group, a straight line connecting the user's chest position and the gaze position on the screen 111. Moreover, not only a straight line but also a curved line may be calculated as a reference coordinate group.

Figure 16:
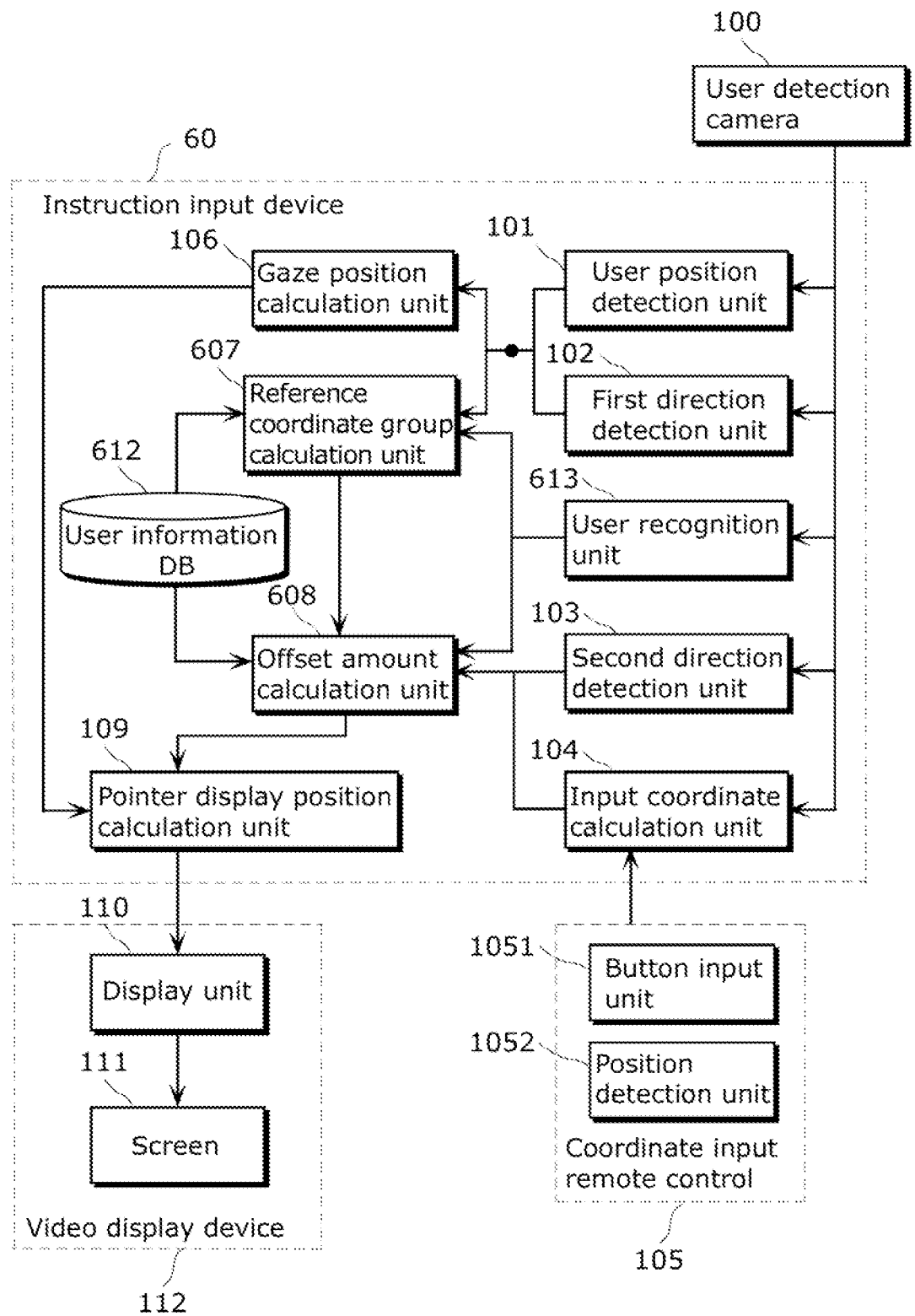
FIG. 16 is a main functional block diagram of the instruction input device according to a modification to Embodiment 2 of the present invention.

Moreover, in the above described method, the reference coordinate group calculation unit 607 obtains the chest position from the physical characteristic information which is information about human average body measurements stored in the user information DB 612, based on the user's head position. In addition, the reference coordinate group calculation unit 607 may obtain the chest position with others excluding the physical characteristic information. For example, as shown in FIG. 16, the instruction input device 60 includes a user recognition unit 613 which recognizes the user by matching between the image captured by the user detection camera 100 and the face image that is already registered. The reference coordinate group calculation unit 607 obtains the user's chest position from the user attribute information for each of the users that is stored and already registered in the user information DB 612, based on user recognition information indicating a recognition result by the user recognition unit 613. As a result, the reference coordinate group calculation unit 607 can calculate the reference coordinate group adapted to the physical characteristics for each of the users. In other words, the reference coordinate group calculation unit 607 calculates a reference coordinate group based on the user's position, the first direction, and information indicating at least the user's chest position obtained from the user information DB 612 based on user recognition information indicating the user recognized by the user recognition unit 613.

Moreover, the reference coordinate group calculation unit 607 may further determine whether the user is in a standing position or a sitting position based on the image captured by the user detection camera 100, and may obtain the user's chest position during sitting from the user information DB 612 in the case where it is determined that the user is in a sitting position.

Figure 14B:
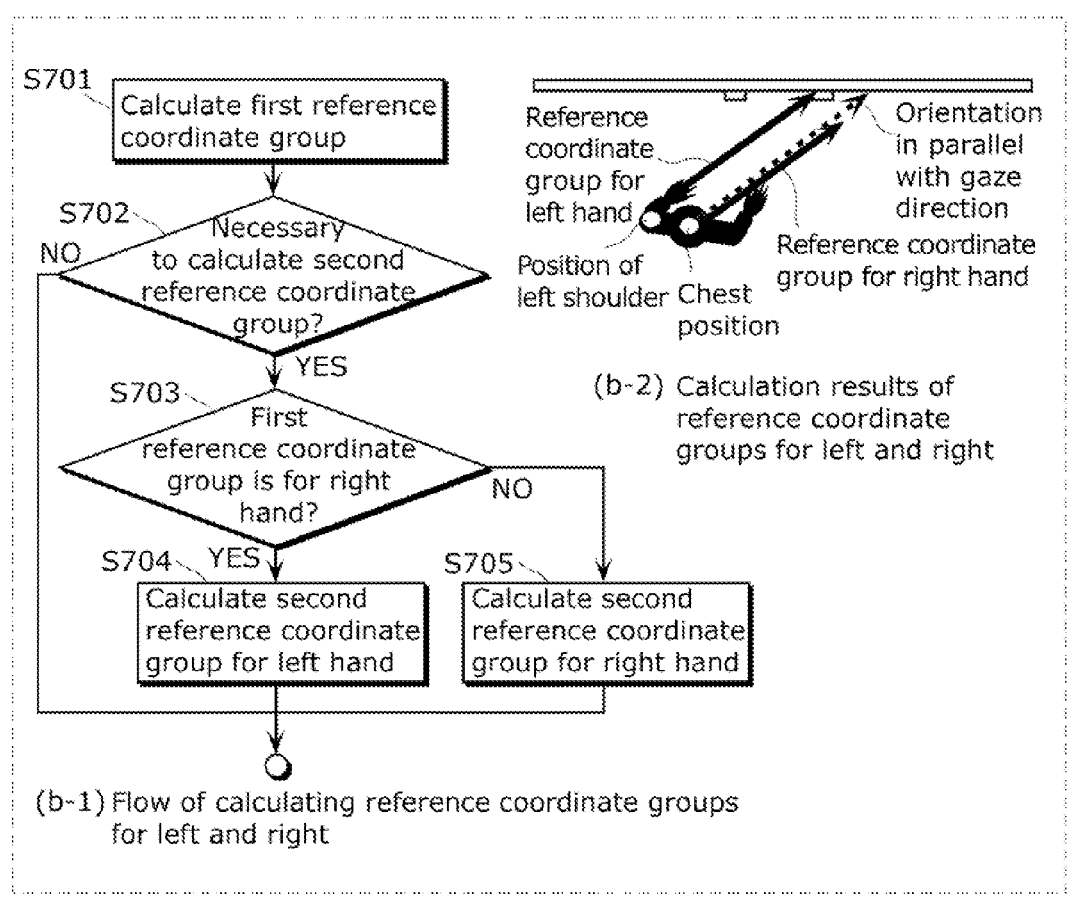
FIG. 14B is a diagram for explaining how to calculate a reference coordinate group based on the user information database according to Embodiment 2 of the present invention.

Moreover, in the above described method, the reference coordinate group calculation unit 607 calculates only one kind of a reference coordinate group. In addition, two or more kinds of reference coordinate groups may be calculated. Hereafter, the method for calculating two kinds of reference coordinate groups will be described with reference to FIG. 14B. FIG. 14B, in (b-1), is a flowchart showing a method for calculating the reference coordinate groups each for the right and the left hands, and FIG. 14B, in (b-2), is a diagram showing an example of a result of calculating the two kinds of reference coordinate groups.

In the case where the user performs an instruction input without changing the body orientation while looking at a distant direction, it is difficult for the user to extend one of the hands on a vector in a gaze direction with respect to the chest position. Therefore, here, in the case where an angle between the first direction and the second direction is smaller than a predetermined angle, the reference coordinate group calculation unit 607 calculates two kinds of reference coordinate groups corresponding to each of the left and right hands based on the user's position and the first direction, information indicating at least a correspondence relationship between the user's head position and the user's chest position obtained from the user information DB 612, and the second direction detected by the second direction detection unit 103. It should be noted that information indicating the above described correspondence relationship indicates the chest height and the shoulder width. First, according to the same method as the above described method, the reference coordinate group calculation unit 607 calculates a first reference coordinate group with respect to the user's chest position (S701). Next, the reference coordinate group calculation unit 607 determines the need of calculating a second reference coordinate group. In the case where the gaze direction and the body orientation are almost the same, it is difficult for the user to extend one of the hands in the gaze direction. Therefore, for example, in the case where an angle difference between the first direction and the second direction is from 0 to 30 degrees or from 150 to 180 degrees, the reference coordinate group calculation unit 107 determines that it is necessary to calculate the second reference coordinate group (S702).

In the case where it is determined that it is necessary to calculate the second reference coordinate group (Yes in S702), the reference coordinate group calculation unit 607 determines that the first reference coordinate group corresponds to the right hand if the gaze direction is toward the right with respect to the body (Yes in S703). Then, the reference coordinate group calculation unit 607 calculates the position of the left shoulder based on the user's shoulder width obtained from the user information DB 612, and calculates a vector in a gaze direction with respect to the position as the second reference coordinate group for the left hand (S704). Moreover, in the case where the gaze direction is toward the left with respect to the body (No in S703), the reference coordinate group calculation unit 607 calculates a vector in the gaze direction with respect to the position of the right shoulder as the second reference coordinate group for the right hand (S705).

In the case where it is determined that it is not necessary to calculate the second reference coordinate group because the gaze direction is almost toward the front with respect to the body (No in S702), the reference coordinate group calculation unit 607 ends the calculation of the reference coordinate group.

As described above, the reference coordinate group calculation unit 607 can appropriately calculate the reference coordinate group based on the second direction in the case where it is difficult for the user to extend a hand on a vector in a gaze direction with respect to the chest position.

Moreover, in the method for calculating the two kinds of reference coordinate groups, the reference coordinate group calculation unit 607 calculates the reference coordinate group for each of the left and right hands based on the gaze orientation (gaze direction) and the body orientation. However, the reference coordinate group calculation unit 607 may calculate the reference coordinate group based on the dominant eye information stored in the user attribute information of the user information DB 612. More specifically, for example, in the case where the recognized user's dominant eye is a right eye, the reference coordinate group calculation unit 607 may calculate a vector in the gaze direction with respect to the user's chest position as the reference coordinate group for the right hand, and calculate a vector in the gaze direction with respect to the position of the left shoulder as the reference coordinate group for the left hand.

<Offset Amount Calculation Unit>

The offset amount calculation unit 608 calculates an offset amount from the user's gaze position on the screen 111, based on the reference coordinate group calculated by the reference coordinate group calculation unit 607, the second direction detected by the second direction detection unit 103, information about the chest position and the arm length obtained from the user information DB 612 (information indicating a correspondence relationship between the user's head position and the user's arm position), and the position coordinates of the hand detected by the coordinate input detection unit 104.

Figure 15A:
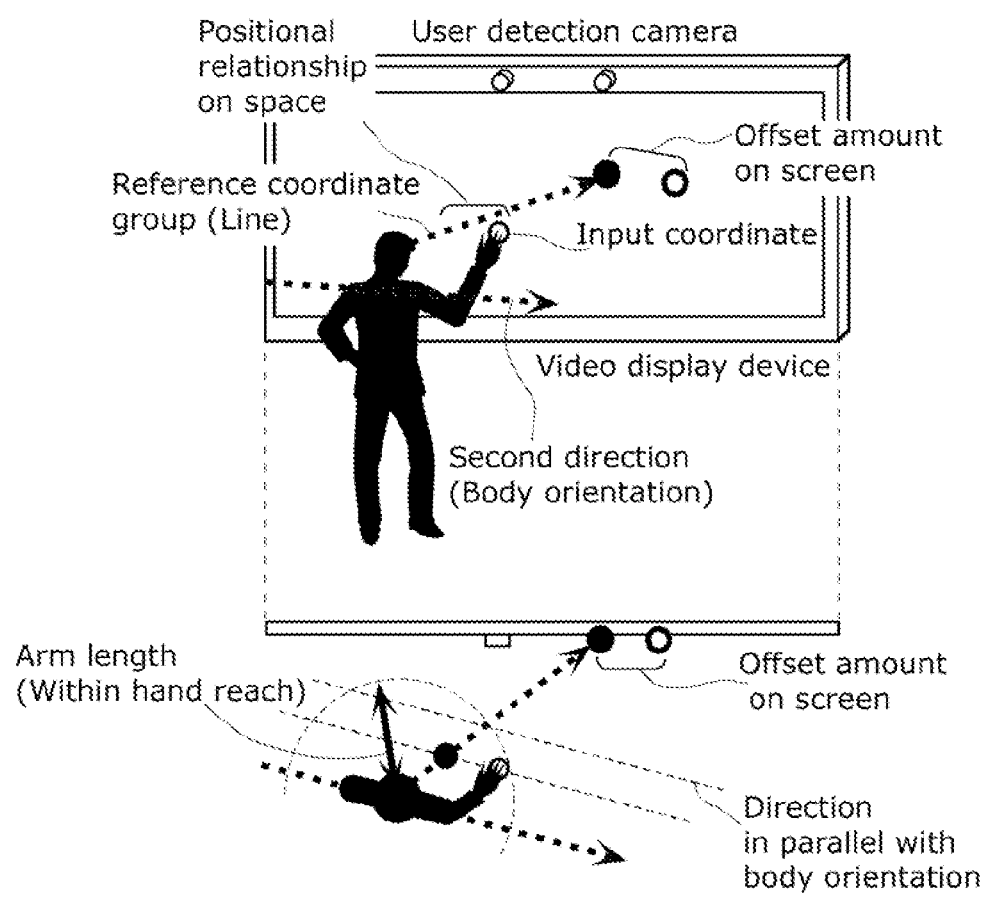
FIG. 15A is a diagram for explaining how to calculate an offset amount based on the user information database according to Embodiment 2 of the present invention.

FIG. 15A is a diagram showing a method for calculating an offset amount on the screen by the offset amount calculation unit 608 according to Embodiment 2 of the present invention. It should be noted that in FIG. 15A, the positional relationship between the user and the screen 111 is indicated from the front and above. The offset amount calculation unit 608 calculates an offset amount from the user's gaze position on the screen 111 by transforming a three-dimensional spatial positional relationship between the reference coordinate group and the position coordinates of a hand into a positional relationship on the screen 111. Hereafter, an outline of a method for calculating the offset amount will be described with reference to FIG. 15B.

Figure 15B:
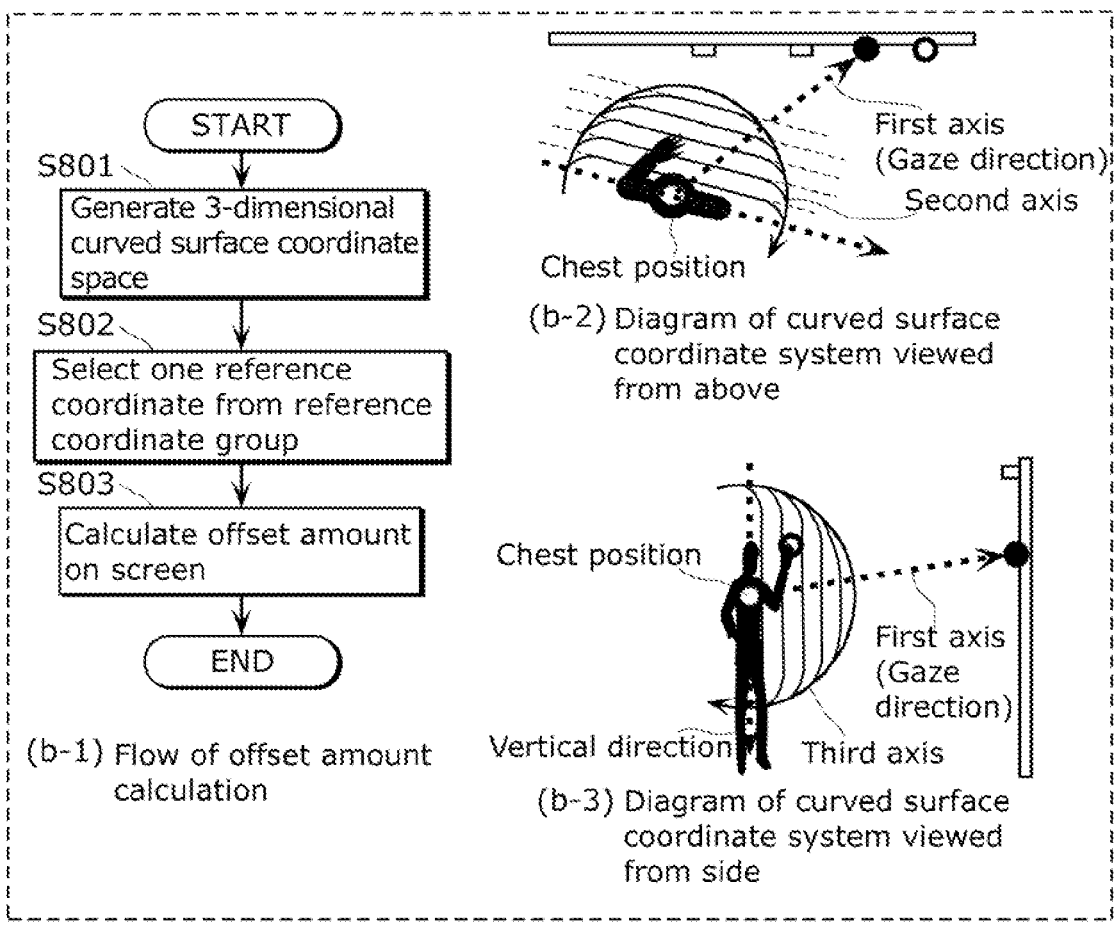
FIG. 15B is a diagram for explaining how to calculate an offset amount based on the user information database according to Embodiment 2 of the present invention.

FIG. 15B, in (b-1), shows a flowchart showing a method for calculating an offset amount. Moreover, FIG. 15B, in each of (b-2) and (b-3), shows a diagram which shows a view from the above of and a view from the side of, respectively, a three-dimensional curved surface coordinate space generated in the process of the offset amount calculation.

In the case where the user performs an instruction input while moving the hand, the user has no choice but to move the hand in a circular arc when the user straightens the elbow, while in the case where there is a leeway angle of the elbow, the user mainly shifts the hand to a direction mainly parallel with the body orientation. In other words, for example, when the user moves the hand in parallel with the body orientation around the front of the body where there is a leeway angle of the elbow and gradually moves the hand while straightening the elbow, the elbow is finally straightened and therefore the user moves the hand in a circular arc. Therefore, first, the offset amount calculation unit 608 determines, as an original point, the user's chest position obtained from the physical characteristic information stored in the user information DB 612, and generates a three-dimensional curved surface coordinate space comprising the first axis along the gaze direction detected by the first direction detection unit 102, the second axis indicated by a black solid line in (b-2) of FIG. 15B, and the third axis indicated by a black solid line in (b-3) of FIG. 15B (S801). Here, the second axis is an axis set based on the body orientation detected by the second direction detection unit 103 and information about the user's arm length obtained from the physical characteristic information stored in the user information DB 612. Moreover, the third axis is an axis set based on the vertical direction and the user's arm length which is obtained from the physical characteristic information stored in the user information DB 612.

Next, the offset amount calculation unit 608 transforms the position coordinate of the hand detected by the coordinate input detection unit 104 into a coordinate in a three-dimensional curved plate coordinate space, and selects one point which is the reference coordinate in which the position coordinate of the hand matches a coordinate value about the first axis from the reference coordinate groups calculated by the reference coordinate group calculation unit 607 (S802). Then, the offset amount calculation unit 608 calculates the difference between the hand position coordinate in the second axis and the selected reference coordinate and the difference between the hand position coordinate in the third axis and the selected reference coordinate as an offset amount in a horizontal direction and an offset amount in a vertical direction from the user's gaze position on the screen 111, respectively (S803).

Since, by the above described processing, the offset amount calculation unit 608 can calculate an offset amount in consideration of the user's arm length, the amount of movement of the pointer on the screen with respect to the amount of movement by the user's hand can be unchanged according to the difference in the arm length.

It should be noted that in the above described method, the offset amount calculation unit 608 sets the third axis in the three-dimensional coordinate space from the vertical direction and the user's arm length. In addition to such, the offset amount calculation unit 608 may detect a direction from the head of the user's upper body to the abdominal region and may set the third axis based on the direction and the user's arm length.

Moreover, in the above described method, the offset amount calculation unit 608 determines the user's chest position as the original point in the three-dimensional curved surface coordinate space. In addition to this, the position of the user's face may be an original point.

Moreover, in the above described method, the offset amount calculation unit 608, based on the user's position, obtains information about the user's chest position and the user's arm length based on the physical characteristic information which is information about human average body measurements stored in the user information DB 612. However, the offset amount calculation unit 608 may further obtain information about the user's chest position and the user's arm length. For example, as shown in FIG, 16, the instruction input device 60 includes a user recognition unit 613 which recognizes the user by matching between the image captured by the user detection camera 100 and the face image that is already registered. The offset amount calculation unit 608 obtains information about the user's chest position and the user's arm length from the user attribute information for each of the users that is stored and already registered in the user information DB 612, based on user recognition information indicating a recognition result by the user recognition unit 613. As a result, the offset amount calculation unit 608 can calculate an offset amount adapted to the physical characteristics for each of the users. In other words, the offset amount calculation unit 608 calculates an offset amount based on the second direction and information which indicates at least the user's arm length obtained from the user information DB 612 based on user recognition information indicating the user recognized by the user recognition unit 613.

Moreover, the offset amount calculation unit 608 may further determine whether the user is in a standing position or a sitting position from the image captured by the user detection camera 100, and obtain information about the user's chest position and the user's arm length during sitting from the user information DB 612 in the case where it is determined that the user is in a sitting position.

Moreover, in the above described method, the offset amount calculation unit 508 calculates an offset amount based on only one kind of a reference coordinate group. However, in the case where two kinds of reference coordinate groups for the left and right hands are calculated by the reference coordinate group calculation unit 607, an offset amount may be calculated based on the left and right hand recognition information obtained from the coordinate input detection unit 104.

Furthermore, in the above described method, the offset amount calculation unit 508 calculates only one kind of a three-dimensional curved surface coordinate space. However, there is a gap, by the shoulder width, between the movements of the user's left and right hands. Therefore, the offset amount calculation unit 608 may generate two kinds of coordinate spaces for the left and right hands with the use of information about the shoulder width obtained from the user information DB 612 and calculate an offset amount based on the left and right hand recognition information obtained from the coordinate input detection unit 104.

As described the above, the instruction input device 60 according to the present embodiment can calculate the reference coordinate group with respect to the user's chest position, and therefore makes it possible to calculate the reference coordinate group according to a pointing operation by the user's natural posture. Since it is possible to calculate the offset amount in consideration of the user's arm length, the amount of movement of the pointer on the screen with respect to the amount of movement by the user's hand cannot be changed anymore.

The instruction input device according to the present invention has been described based on the embodiments, but the present invention is not defined only by the embodiments. Modifications to the embodiments or configurations through a combination of constituent elements in the different embodiments that are conceived by those skilled in the art are possible without materially departing from the novel teachings and advantages of this invention. Accordingly, all such modifications are intended to be included within the scope of this invention.

For example, the above described Embodiments 1 and 2, the instruction input device does not include the user detection camera 100, the coordinate input remote control 105, and the video display device 112, but the instruction input device may include these. For example, the instruction input device may include the user detection camera 100 as an imaging unit. Moreover, for example, the instruction input device may include the coordinate input remote control 105 as a three-dimensional coordinate input device. Moreover, for example, the instruction input device may include the display unit 110 included in the video display device 112.

Moreover, in the above described embodiments, a description is focused on the case where the number of users performing a pointing operation is one. However, the pointing operation may be performed by two or more users. In this case, the instruction input device may calculate the display position of the pointer for each of the users performing a pointing operation.

Moreover, the instruction input device according to the above described Embodiment 1 or 2 may be implemented by a computer which includes a Central Processing Unit (CPU), a Read Only Memory (ROM) a Random Access Memory (RAM), and the like.

Moreover, part or all of the constituent elements of the instruction input device according to Embodiment 1 or 2 may be composed of one Large System Integration. For example, the instruction input device may be composed of a system LSI which includes the user position detection unit 101, the first direction detection unit 102, the second direction detection unit 103, the coordinate input detection unit 104, the gaze position calculation unit 106, the reference coordinate group calculation unit 107, and the offset amount calculation unit 108.

The system LSI is a super-multi-function LSI manufactured by integrating constituent units on one chip, and is especially a computer system configured by including a microprocessor, ROM, RAM, and so on, A computer program is stored in the RAM. The System-LSI achieves its function through the microprocessor's operation according to the computer program.

Furthermore, here, System-LSI is mentioned, but there are instances where, due to a difference in the degree of integration, the designations IC, LSI, super-LSI and ultra-LSI are used. Furthermore, the means for integrated circuit is not limited to an LSI, and implementation with a dedicated circuit or a general-purpose processor is also available. In addition, it is acceptable to use a Field Programmable Gate Array (FPGA) that is programmable after the LSI has been manufactured, and a reconfigurable processor in which connections and settings of circuit cells within the LSI are reconfigurable.

Furthermore, if integrated circuit technology that replaces LSI appears through progress in semiconductor technology or other derived technology, that technology can be naturally used to carry out integration of the constituent elements. Biotechnology is anticipated to apply.

Moreover, the present invention can be implemented not only as an instruction input device with such characteristic processing units but also as an image decoding method which includes, as steps, the characteristic processing units included in the instruction input device. Moreover, each of the steps included in the image decoding method can be implemented as a computer program which causes a computer to perform each of the steps. It goes without saying that the computer program can be distributed via a computer readable recording medium such as CD-ROM or a communication network such is as the Internet.

[Industrial Applicability]

Since the present invention allows the user to perform a pointing at a desired position on the screen by an input operation with a natural posture without the need of moving, it can be applicable to a large screen display with a wide instruction input region, such as an electronic outdoor advertisement and a large screen television (digital signage).

[Reference Signs List]

10, 60 Instruction input device
100 User detection camera
101 User position detection unit
102 First direction detection unit
103 Second direction detection unit
104 Coordinate input detection unit
105 Coordinate input remote control
1051 Button input unit
1052 Position detection unit
106 Gaze position calculation unit
107, 607 Reference coordinate group calculation unit
108, 608 Offset amount calculation unit
109 Pointer display position calculation unit
110 Display unit
111 Screen
112 Video display device
612 User information DB
613 User recognition unit

The invention claimed is:

1. An instruction input device which calculates a display position of a pointer to be displayed on a two-dimensional screen, based on a pointing operation of movement of a hand of a user in a three-dimensional space, the instruction input device comprising:
   a user position detection unit configured to detect a three-dimensional position of the user;
   an input coordinate detection unit configured to detect, as a three-dimensional input coordinate, a coordinate indicating a three-dimensional position of the hand of the user;
   a first direction detection unit configured to detect, based on a body posture of the user, a first direction which is determined with respect to a screen vertical direction and is a direction in which the user is looking;
   a second direction detection unit configured to detect, based on the body posture of the user, a second direction which is determined with respect to a screen horizontal direction and is a direction in which the user is performing the pointing operation;
   a gaze position calculation unit configured to calculate a gaze position of the user on the two-dimensional screen, based on the three-dimensional position of the user and the first direction;
   a reference line calculation unit configured to calculate a reference line in a three-dimensional space between the user and the two-dimensional screen, based on the three-dimensional position of the user and the first direction, the reference line being a line corresponding to the gaze position;
   an offset amount calculation unit configured to (i) calculate, as a reference point, a point from among a plurality of points on the reference line, the reference point being calculated such that a direction between the three-dimensional input coordinate and the reference point is parallel to the second direction, and (ii) calculate a positional relationship between the reference point and the three-dimensional input coordinate as an offset amount with respect to the gaze position in a first screen predetermined direction along the two-dimensional screen; and
   a pointer display position calculation unit configured to calculate, as the display position of the pointer to be displayed on the two-dimensional screen, a position in which a distance of the first screen predetermined direction between the position and the gaze position is the offset amount on the two-dimensional screen.

2. The instruction input device according to claim 1, wherein the three-dimensional position of the user is a face position or a head position of the user.

3. The instruction input device according to claim 1, further comprising a three-dimensional coordinate input device which outputs a self position when held by the user,
   wherein the input coordinate detection unit is configured to detect, as the three-dimensional input coordinate, a three-dimensional coordinate of the self position output by the three-dimensional coordinate input device.

4. The instruction input device according to claim 1, further comprising
   an imaging unit configured to capture an image of the user,
   wherein the input coordinate detection unit is configured to detect the three-dimensional input coordinate indicating the three-dimensional position of the hand of the user, based on an image captured by the imaging unit.

5. The instruction input device according to claim 4,
   wherein the input coordinate detection unit is further configured to recognize right and left hands of the user based on an image captured by the imaging unit, and detect the three-dimensional input coordinate for each of the recognized right and left hands.

6. The instruction input device according to claim 1,
   wherein the first direction detection unit is configured to detect the first direction based on the body posture of the user which includes at least one of a face orientation and a gaze.

7. The instruction input device according to claim 1,
   wherein the second direction detection unit is configured to detect the second direction based on the body posture of the user which includes at least a body orientation.

8. The instruction input device according to claim 7,
   wherein the second direction detection unit is configured to detect the second direction based on the body posture of the user and a direction of the two-dimensional screen with respect to the three-dimensional position of the user.

9. The instruction input device according to claim 1,
wherein the reference line calculation unit is configured to calculate the reference line based on the three-dimensional position of the user, the first direction, and the second direction, in the case where an angle between the first direction and the second direction is smaller than a predetermined angle.

10. The instruction input device according to claim 1, further comprising
a user information database which stores information indicating at least a correspondence relationship between a head position and a chest position of the user,
wherein the reference line calculation unit is configured to calculate the reference line based on the three-dimensional position of the user, the first direction, and information indicating the correspondence relationship obtained from the user information database.

11. The instruction input device according to claim 1, further comprising:
a user information database which stores information indicating at least a chest position of each user; and
a user recognition unit configured to recognize the user,
wherein the reference line calculation unit is configured to calculate the reference line based on the three-dimensional position of the user, the first direction, and information which indicates at least the chest position of the user and is obtained from the user information database based on user recognition information indicating the user recognized by the user recognition unit.

12. The instruction input device according to claim 10,
wherein the reference line calculation unit is configured to calculate the reference line based on the three-dimensional position of the user, the first direction, information indicating the correspondence relationship obtained from the user information database, and the second direction, in the case where an angle between the first direction and the second direction is smaller than a predetermined angle.

13. The instruction input device according to claim 1, further comprising
a user information database which stores information indicating at least a correspondence relationship between a head position and an arm length of the user,
wherein the offset amount calculation unit is configured to calculate the offset amount based on the second direction and information indicating the correspondence relationship obtained from the user information database.

14. The instruction input device according to claim 1, further comprising:
a user information database which stores information indicating at least an arm length for each user; and
a user recognition unit configured to recognize the user,
wherein the offset amount calculation unit is configured to calculate the offset amount based on the second direction and information which indicates at least the arm length of the user, and
the information is obtained from the user information database based on user recognition information indicating the user recognized by the user recognition unit.

15. The instruction input device according to claim 1, further comprising
a display unit configured to display the pointer on the display position calculated by the pointer display position calculation unit.

16. The instruction input device according to claim 1,
wherein the offset amount calculation unit is configured to calculate a distance in a third direction between the reference line and the input coordinate as another offset amount with respect to the gaze position in a second screen predetermined direction along the screen,
the pointer display position calculation unit is configured to calculate, as a display position of the pointer displayed on the two-dimensional screen, a position in which a distance in the second screen predetermined direction between the position and the gaze position is the other offset amount on the two-dimensional screen, and
the third direction is a direction different from the first direction and the second direction, and the second screen predetermined direction is a direction different from the first screen predetermined direction.

17. An instruction input method for calculating a display position of a pointer to be displayed on a two-dimensional screen, based on a pointing operation of movement of a hand of a user in a three-dimensional space, the instruction input method comprising:
detecting a three-dimensional position of the user;
detecting, as a three-dimensional input coordinate, a coordinate indicating a three-dimensional position of the hand of the user;
detecting, based on a body posture of the user, a first direction which is determined with respect to a screen vertical direction and is a direction in which the user is looking;
detecting, based on the body posture of the user, a second direction which is determined with respect to a screen horizontal direction and is a direction in which the user is performing the pointing operation;
calculating a gaze position of the user on the screen, based on the three-dimensional position of the user and the first direction;
calculating a reference line in a three-dimensional space between the user and the two-dimensional screen, based on the three-dimensional position of the user and the first direction, the reference line being a line corresponding to the gaze position;
calculating, as a reference point, a point from among a plurality of points on the reference line, the reference point being calculated such that a direction between the three-dimensional input coordinate and the reference point is parallel to the second direction;
calculating a positional relationship between the reference point and the three-dimensional input coordinate as an offset amount with respect to the gaze position in a first screen predetermined direction along the two-dimensional screen; and
calculating, as a display position of the pointer to be displayed on the two-dimensional screen, a position in which a distance in the first screen predetermined direction between the position and the gaze position is the offset amount on the two-dimensional screen.

18. A non-transitory recording medium having stored thereon a program for calculating a display position of a pointer to be displayed on a two-dimensional screen, based on a pointing operation of movement of a hand of a user in a three-dimensional space, the program causing a computer to execute:
detecting a three-dimensional position of the user;
detecting, as a three-dimensional input coordinate, a coordinate indicating a three-dimensional position of the hand of the user;

detecting, based on a body posture of the user, a first direction which is determined with respect to a screen vertical direction and is a direction in which the user is looking;

detecting, based on the body posture of the user, a second direction which is determined with respect to a screen horizontal direction and is a direction in which the user is performing the pointing operation;

calculating a gaze position of the user on the two-dimensional screen, based on the three-dimensional position of the user and the first direction;

calculating a reference line in a three-dimensional space between the user and the two-dimensional screen, based on the three-dimensional position of the user and the first direction, the reference line being a line corresponding to the gaze position;

calculating, as a reference point, a point from among a plurality of points on the reference line, the reference point being calculated such that a direction between the three-dimensional input coordinate and the reference point is parallel to the second direction;

calculating a positional relationship between the reference point and the three-dimensional input coordinate as an offset amount with respect to the gaze position in a first screen predetermined direction along the two-dimensional screen; and calculating, as a display position of the pointer to be displayed on the two-dimensional screen, a position in which a distance in the first screen predetermined direction between the position and the gaze position is the offset amount on the two-dimensional screen.

19. An integrated circuit which calculates a display position of a pointer to be displayed on a two-dimensional screen, based on a pointing operation of movement of a hand of a user in a three-dimensional space, the integrated circuit comprising:

a user position detection unit configured to detect a three-dimensional position of the user;

an input coordinate detection unit configured to detect, as a three-dimensional input coordinate, a coordinate indicating a three-dimensional position of the hand of the user;

a first direction detection unit configured to detect, based on a body posture of the user, a first direction which is determined with respect to a screen vertical direction and is a direction in which the user is looking;

a second direction detection unit configured to detect, based on the body posture of the user, a second direction which is determined with respect to a screen horizontal direction and is a direction in which the user is performing the pointing operation;

a gaze position calculation unit configured to calculate a gaze position of the user on the two-dimensional screen, based on the three-dimensional position of the user and the first direction;

a reference line calculation unit configured to calculate a reference line in a three-dimensional space between the user and the two-dimensional screen, based on the three-dimensional position of the user and the first direction, the reference line being a line corresponding to the gaze position;

an offset amount calculation unit configured to (i) calculate, as a reference point, a point from among a plurality of points on the reference line, the reference point being calculated such that a direction between the three-dimensional input coordinate and the reference point is parallel to the second direction, and (ii) calculate a positional relationship between the reference point and the three-dimensional input coordinate as an offset amount with respect to the gaze position in a first screen predetermined direction along the two-dimensional screen; and a pointer display position calculation unit configured to calculate, as a display position of the pointer to be displayed on the two-dimensional screen, a position in which a distance of the first screen predetermined direction between the position and the gaze position is the offset amount on the two-dimensional screen.

* * * * *